US012775838B2

(12) United States Patent
Mathaikutty et al.

(10) Patent No.: US 12,775,838 B2
(45) Date of Patent: Oct. 27, 2026

(54) DATA REUSE IN DEEP LEARNING

(71) Applicant: Intel Corporation, Santa Clara, CA (US)

(72) Inventors: Deepak Abraham Mathaikutty, Chandler, AZ (US); Arnab Raha, Santa Clara, CA (US); Raymond Jit-Hung Sung, San Francisco, CA (US); Debabrata Mohapatra, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1275 days.

(21) Appl. No.: 17/684,764

(22) Filed: Mar. 2, 2022

(65) Prior Publication Data

US 2022/0188638 A1 Jun. 16, 2022

(51) Int. Cl.

| | |
|---|---|
| ***G06N 3/00*** | (2023.01) |
| ***G06F 7/544*** | (2006.01) |
| ***G06N 3/063*** | (2023.01) |
| ***G06N 3/08*** | (2023.01) |
| *G06V 10/44* | (2022.01) |
| *G06V 10/764* | (2022.01) |
| *G06V 10/77* | (2022.01) |

(Continued)

(52) U.S. Cl.

CPC ............. *G06N 3/08* (2013.01); *G06F 7/5443* (2013.01); *G06N 3/063* (2013.01); *G06V 10/449* (2022.01); *G06V 10/764* (2022.01); *G06V 10/7715* (2022.01); *G06V 10/774* (2022.01); *G06V 10/82* (2022.01)

(58) Field of Classification Search

None

See application file for complete search history.

(56) References Cited

U.S. PATENT DOCUMENTS

| | | | |
|---|---|---|---|
| 2020/0134417 | A1 | 4/2020 | Mohapatra et al. |
| 2020/0228137 | A1 | 7/2020 | Chinya et al. |
| 2020/0410327 | A1 | 12/2020 | Chinya et al. |

(Continued)

OTHER PUBLICATIONS

He et al."Deep Residual Learning for Image Recognition", Computer Vision and Pattern Recognition, retrieved from https://arxiv.org/abs/1512.03385 on Feb. 11, 2022, 12 pages.

(Continued)

*Primary Examiner* — Tuankhanh D Phan

(74) *Attorney, Agent, or Firm* — Akona IP PC

(57) ABSTRACT

An apparatus for convolution operations is provided. The apparatus includes a PE array, a datastore, writing modules, reading modules, and a controlling module. The PE array performs MAC operations. The datastore includes databanks, each of which stores data to be used by a column of the PE array. The writing modules transfer data from a memory to the datastore. The reading modules transfer data from the datastore to the PE array. Each reading module may transfer data to a particular column of the PE array. The controlling module can determine the rounds of a convolution operation. Each round includes MAC operations based on a weight. The controlling module controls the writing modules and reading modules so that the same data in a databank can be reused in multiple rounds. For different rounds, the controlling module can provide a reading module accesses to different databanks.

25 Claims, 19 Drawing Sheets

(51) Int. Cl.
*G06V 10/774* (2022.01)
*G06V 10/82* (2022.01)

(56) References Cited

U.S. PATENT DOCUMENTS

| | | | | |
|---|---|---|---|---|
| 2021/0081769 | A1* | 3/2021 | Chen | G06F 15/7892 |
| 2022/0405056 | A1* | 12/2022 | Winterbottom | G02B 6/43 |

OTHER PUBLICATIONS

Intel Movidius Myriad X Vision Processing Unit, retrieved from https://www.intel.com/content/www/us/en/products/details/processors/movidius-vpu/movidius-myriad-x.html on Feb. 11, 2022.

M. Rhu, M. O'Connor, N. Chatterjee, J. Pool, Y. Kwon and S. W. Keckler, "Compressing DMA Engine: Leveraging Activation Sparsity for Training Deep Neural Networks," 2018 IEEE International Symposium on High Performance Computer Architecture (HPCA), 2018, pp. 78-91.

* cited by examiner

DATA REUSE IN DEEP LEARNING

TECHNICAL FIELD

This disclosure relates generally to neural networks, and more specifically, to accelerating deep neural networks (DNNs).

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as hundreds of millions of filter weights to be stored for classification or detection. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
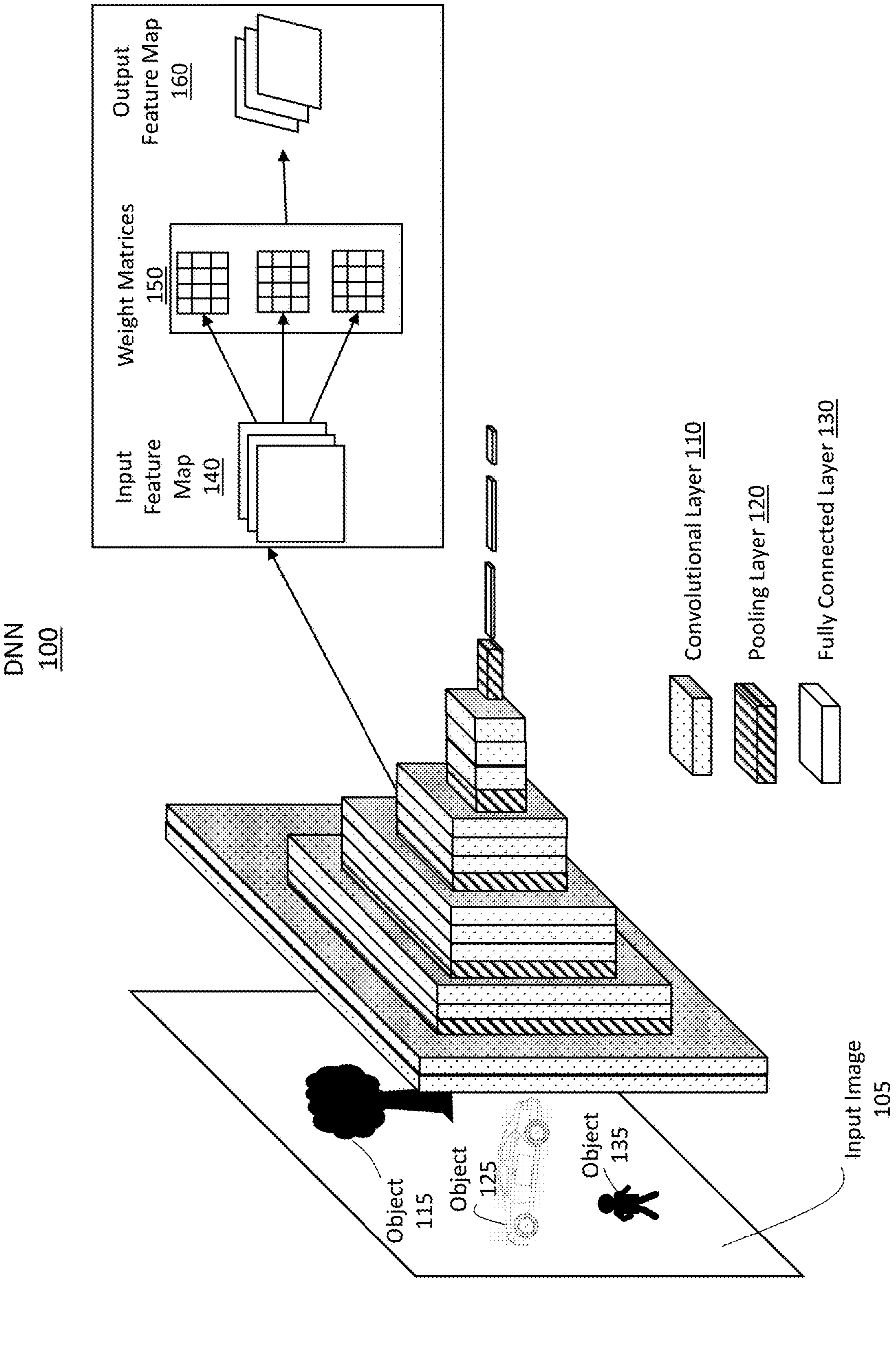
FIG. 1 illustrates a layer architecture of an example DNN, in accordance with various embodiments.

A focus of revolutions in deep learning (DL) lies in neural network architectures and hardware systems on which DL workloads can be accelerated. It is important to improve the energy efficiency of DNN accelerators. One way to improve the energy efficiency of DNN accelerators is to reduce data movement in DL processes. The amount of activation and weight data distributed through the accelerator for a network layer is driven by a compiler that determines the sequence of data movement for optimal energy. This data volume must be stored and circulated in a manner to maximize throughput performance, which is determined by the levels of memory, the amount of storage at each level and the physical distance that the data must travel before computation can start.

In order to address these challenges in long-distance routing and large latencies associated with data orchestration, e.g., from a system memory to local register files inside PEs, most DNN accelerators introduce intermediate storage structures along the data distribution network. These storage structures (referred to as datastore) are performant for data orchestration through sparsity decoding and sparsity alignment.

In one solution, sparsity decoding and sparsity alignment are performed in datastores before data is transferred to the PEs. Compared with DNN accelerators where sparsity decoding and sparsity alignment are performed by PEs, the datastores can reduce the space and power consumed by sparsity decoding and sparsity alignment.

These datastores often have well-defined layouts. For instances, a datastore may include a sequence of databanks, each of which includes a sequence of storage units. Each storage unit stores a single context, despite the size of the context or the storage capacity of t the storage unit. A context is a portion of the input (e.g., a portion of an input image or an input feature map) to a DNN layer, such as a convolutional layer. The context includes input data for a single MAC operation by a single PE. The context includes one or more input channels, e.g., all the input channels needed by the PE to perform the MAC operation. A context may be represented by coordinates in a two-dimensional or three-dimensional system. For instance, a context may be referred to as (X,Y) or (X, Y, Z), where X, Y, and Z are integers.

Also, these datastores often enforce rigid access patterns for agents that read data from the storage units into the PEs. For instance, many datastores couples a particular agent with a single databank and allows the particular agent to read data only from that databank. The purpose of these requirements is to reduce the wiring complexity to access data from these datastores and allow them to be high performant.

However, such requirements cause a constraint on data reuse when the same context is expected to be in a storage unit for load round 1 but in another storage unit for load round 2. That way, the reusable data is overwritten during load round 2 and the same data will need to be re-retrieved in subsequent load rounds as well. These constraints can require the data distribution network to retrieve the same context many times and place them in their respective storage units for loading data to the PEs. Therefore, the DNN accelerator must pay the extra penalty in terms of memory access and energy consumption associated with these additional transfers.

The problem can be worse in cases where the number of input channels are large and doesn't fit within a single storage unit. In an example where DNN layers have input channels larger than say 64 (say 256) but a storage unit can only store up to 64 input channels at a time due to the storage limitations, the input channels have to be written into the storage unit in over four rounds to feed the remaining 192 input channels to the PE array. In each of these four rounds, the data written into the storage unit in the previous round must be overwritten. Thus, the distribution of data for subsequent rounds will result in overwriting the data brought in for the earlier rounds. This further prevents reuse of the data at a context-level and would require the data distribution network to re-retrieve the same data over and over again.

To maximize data reuse and improve energy efficiency of DNN accelerators, it is important to improve data reuse and minimize the number of times the same data is fetched from the system memory to datastores. Improved technology for data orchestration in DNN accelerators is needed.

Embodiments of the present disclosure provide apparatus and methods for improving data reuse and energy efficiency of DNN accelerators by providing flexibility in data storage and data retrieval. An example apparatus may be a DNN accelerator that includes a PE array and a data orchestration engine. The PE array includes a plurality of PEs arranged in columns and rows and is configured to perform MAC operations. The data orchestration engine is configured to load data from a memory (e.g., a system memory) to the PE array. The data orchestration engine includes a datastore including storage units where contexts can be stored, writing modules for writing data from the memory into the datastore, and reading modules for reading data from the datastore into the PE array. The data orchestration engine also has a controlling module that controls the datastore, writing module, and reading module in a way to increase (or even maximize) data reuse but decrease (or even minimize) memory accesses in a convolution operation of a DNN layer.

In some embodiments, the data orchestration engine allocates the storage units to the contexts for a convolution operation and the allocation can be flexible with respect to both the number of storage units for a single context and the number of contexts for a single storage unit. For instance, the data orchestration engine may compare a size of a context (e.g., the number of input channels in the context) with a storage limit of a storage unit (e.g., the maximum number of input channels the storage unit can store). The data orchestration engine may allocate a single storage unit to a single context, e.g., when the size of the context is equal to or smaller than the storage limit of the storage unit. In examples where the size of the context is larger than the storage limit of the storage unit, the data orchestration engine may "fuse" multiple storage units into a combined unit and allocate the combined unit to the context. In examples where the data orchestration engine determines that the storage unit has sufficient capacity to store multiple contexts, the data orchestration engine may allocate the storage unit to multiple contexts and these contexts share the single storage unit.

Compared with one storage unit for one context, the flexibility provided by the data orchestration engine can reduce the number of memory access and increase data reuse rate (e.g., the number of times data is reused) in the convolution operation. For instance, when a context is too large but can use a single storage unit, the context must be loaded through multiple accesses to the memory, and the previous data loaded into the storage unit in a previous round must be removed when new data is loaded in a new round. That way, the previous data cannot be reused in the new round. In contrast, by using a combined unit that can store the whole context, the number of accessing the memory is reduced to one. Also, the whole context is present can be used for multiple rounds. Similarly, when the size of the context is too small, by sharing a single storage unit with other contexts, the number of memory accesses for these contexts is reduced but the reuse rate of the contexts are higher. The capability of fusing or sharing storage units of the present disclosure can maximize data reuse in the context level.

Furthermore, the data orchestration engine can facilitate flexible accesses of the reading modules to the datastore. The datastore includes databanks, each of which has a number of storage units. A reading module may access a first databank in a first round but access a second databank in a second round to reuse the data in the second databank, which was loaded in the first round or another round. In some embodiments, the data orchestration engine uses a sliding window pattern for the flexible accesses of the reading modules to the datastore. The sliding window pattern may be based on a sequence of the databanks. In an example, a reading module "slides" through some or all the databank in multiple rounds of the convolution operation in an order of the sequence of the databanks. Different reading modules may have different sliding window patterns. The data orchestration engine may determine the sliding window pattern for a reading module based on the rounds in a convolution operation, contexts in each of the rounds, the PE column into which the reading module load data, etc.

Different from data orchestration systems where reading modules have rigid access patterns (e.g., a reading module is provided with accesses to the same databank in different rounds of the convolution operation), the flexible access pattern provided by the present disclosure enables reuse data in a databank level. With the flexible access patterns of the reading modules, the databanks (or some of the databanks) does not have to be reloaded in every round of the convolution operation. Therefore, the present disclosure provides flexibility in both layout of the datastore and accesses of the reading modules to the datastore. Compared with conventional technologies, the present disclosure can reduce memory accesses by the writing modules and increase data reuse in a convolution operation.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN accelerators, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN Layer Architecture

FIG. 1 illustrates a layer architecture of an example DNN 100, in accordance with various embodiments. For purpose of illustration, the DNN 100 in FIG. 1 is a Visual Geometry Group (VGG)-based convolutional neural network (CNN). In other embodiments, the DNN 100 may be other types of DNNs. The DNN 100 is trained to receive images and output classifications of objects in the images. In the embodiment of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers.

The convolutional layers 110 summarize the presence of features in the input image 105. The convolutional layers 110 function as feature extractors. The first layer of the DNN 100 is a convolutional layer 110. In an example, a convolutional layer 110 performs a convolution to an IFM 140 by using weight matrices 150, generates an OFM 160 from the convolution, and passes the OFM 160 to the next layer in the sequence. The IFM 140 may include a plurality of IFM matrices. The OFM 160 may include a plurality of OFM matrices. For the first convolutional layer 110, which is also the first layer of the DNN 100, the IFM 140 is the input image 105. For the other convolutional layers, the IFM 140 may be an output of another convolutional layer 110 or an output of a pooling layer 120. The convolution is a linear operation that involves the multiplication of the weight matrices 150 with the IFM 140. A weight matrix (also referred to as a filter) may be a 2-dimensional array of weights, where the weights are arranged in columns and rows. Weights can be initialized and updated by backpropagation using gradient descent. The magnitudes of the weights can indicate importance of the weight matrices 150 in extracting features from the IFM 140. A filter can be smaller than the IFM 140.

The multiplication applied between a filter-sized patch of the IFM 140 and a filter may be a dot product. A dot product is the element-wise multiplication between the filter-sized patch of the IFM 140 and the corresponding filter, which is then summed, always resulting in a single value. Because it results in a single value, the operation is often referred to as the "scalar product." Using a filter smaller than the IFM 140 is intentional as it allows the same filter (set of weights) to be multiplied by the IFM 140 multiple times at different points on the IFM 140. Specifically, the filter is applied systematically to each overlapping part or filter-sized patch of the IFM 140, left to right, top to bottom. The result from multiplying the filter with the IFM 140 one time is a single value. As the filter is applied multiple times to the IFM 140, the multiplication result is a two-dimensional array of output values that represent a filtering of the IFM 140. As such, the 2-dimensional output array from this operation is referred to a "feature map."

In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculates the convolution of each of them with each of the filters. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size F filters (e.g., a filter is of dimensions F×F×D pixels), the S step with which the window corresponding to the filter is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The DNN 100 includes 16 convolutional layers 110. In other embodiments, the DNN 100 may include a different number of convolutional layers.

The pooling layers 120 downsample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of two pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies a linear combination and an activation function to the input vector and generates an output vector. The output vector may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

Example DNN Accelerator

Figure 2:
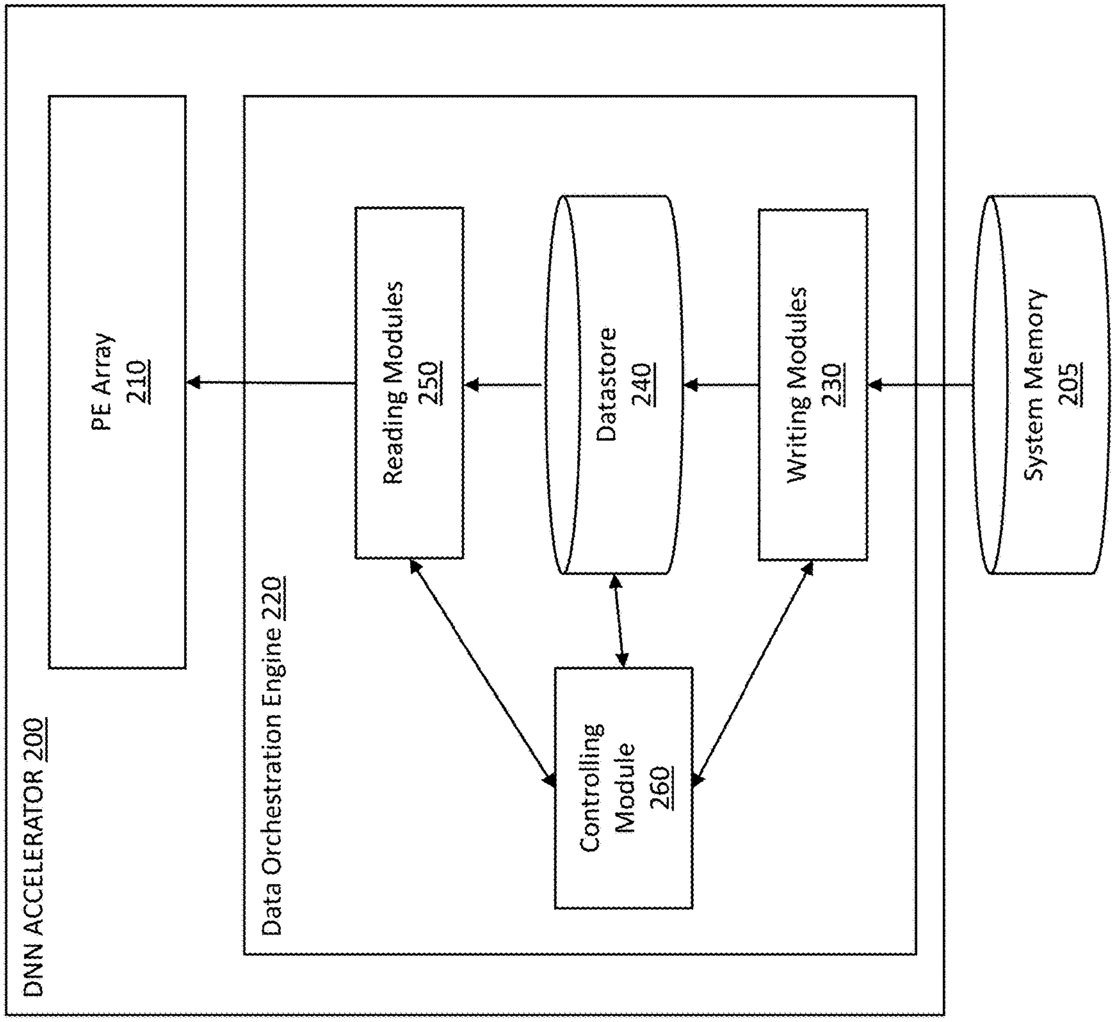
FIG. 2 is a block diagram of a DNN accelerator including a data orchestration engine, in accordance with various embodiments.

FIG. 2 is a block diagram of a DNN accelerator 200 including a data orchestration engine 220, in accordance with various embodiments. The DNN accelerator 200 is coupled with a system memory 205. The system memory 205 stores data associated with the DNN accelerator 200, such as data used by the DNN accelerator 200 for DL, data generated by the DNN accelerator 200, or data otherwise associated with the DNN accelerator 200. The system memory 205 may be a SRAM. In some embodiments, the DNN accelerator 200 may be associated with multiple memories.

The DNN accelerator 200 includes PE array and a data orchestration engine 220. The PE array 210 includes a plurality of PEs that are arranged in columns and rows. A PE array 210 may also be referred to as a tile. In some embodiments, a DNN layer (e.g., a convolutional layer) includes a single PE array. In other embodiments, a DNN layer may include multiple PE arrays. The PE array 210 perform MAC operations, e.g., MAC operations of convolution operations of a convolutional layer of a DNN. More details regarding PE array are described below in conjunction with FIGS. 3A and 3B.

A convolution operation includes MAC operations by the PE array 210 based on a weight matrix. As noted above, a weight matrix includes weights arranged in columns and weights. A convolution operation may include a sequence of rounds of MAC operations by the PE array 210. Each round (also referred to as "convolution operation round") may include MAC operations based on a single weight in the weight matrix and a plurality of contexts. The convolution operation may stride through the weight matrix in different ways. In some embodiments, the convolution operation strides through the rows of the weight matrix first, then strides through the columns of the weight matrix. Taking a 3×3 weight matrix (i.e., a matrix includes 9 weights arranged in three columns and three rows) for example, the convolution operation for the weight matrix includes 9 rounds: the first round uses the first weight in the first column, the second round uses the second weight in the first column, the third round uses the third weight in the first column, the fourth round uses the first weight in the second column, and so on.

In other embodiments, the convolution operation strides through the columns of the weight matrix first, then strides through the rows of the weight matrix. For a 3×3 weight matrix, the first round uses the first weight in the first row, the second round uses the second weight in the first row, the third round uses the third weight in the first row, the fourth round uses the first weight in the second row, and so on.

The data orchestration engine 220 transfers data from the system memory 205 to the PE array 210, e.g., from the system memory 205 to register files of the PEs in the PE array 210. The data orchestration engine 220 may perform sparsity decoding and sparsity alignment operations before it transfers data to the PE array 210. Compared with DNN accelerators where sparsity decoding and sparsity alignment are performed by PEs, the DNN accelerator 200 reduces the space and power consumed by sparsity decoding and sparsity alignment. Different from data orchestration systems that have rigid access patterns for agents loading data to PE arrays, the data orchestration engine 220 provides a flexible databank access pattern for the agents, facilitate (or even maximize) data reuse in DL, and improves energy and space efficiency of the DNN accelerator 200.

As shown in FIG. 2, the data orchestration engine 220 includes writing modules 230 (individually referred to as "writing module 230"), a datastore 240, reading modules 250 (individually referred to as "reading module 250"), and a controlling module 260. In other embodiments, the data orchestration engine 220 may include more, fewer, or different components.

The writing modules 230 write contexts from the system memory 205 into the datastore 240. A writing module 230 may be configured to write data into one or more storage units of the datastore 240. for a convolution operation round. A storage unit may be a block of the datastore 240 that can be managed individually, so that the writing modules 230 may write different contexts into different storage units. Also, a writing module 230 may write data into different storage units for different rounds of a convolution operation. As data in the datastore 240 can be reused (e.g., used in multiple rounds of the convolution operation), the writing modules 230 may not write data into a storage unit in every round. In some embodiments, the writing modules 230 do not write new data into a storage unit in rounds where the storage unit operates in a reuse mode (i.e., a mode that the data in the storage unit will be used again at least once) and writes data into a storage unit after the databank reaches a final mode (i.e., a mode that the data in the storage unit will not be used again). The modes of the storage unit may be controlled by the controlling module 260.

The writing modules 230 may write data into the storage units based on instructions ("writing instructions") from the controlling module 260. A writing instruction may specify one or more contexts to be read from the memory 205, one or more storage units into which a context should be written, a timing to write a context into a storage unit (e.g., which round of a convolution operation), and so on. In some embodiments, a writing instruction may specify whether a storage unit is in a reuse mode or final mode. A writing module 230 may reload the storage unit in a round after the storage unit is switched to the final mode in the previous round, and not reload the storage unit in a round when the storage unit is in the reuse mode in the previous round.

The datastore 240 includes a sequence of databanks. The number of databanks may be equal to or more than the number of columns in the PE array ("PE columns"). A databank may store data to be used by a PE column. A databank includes a plurality of storage units. In an embodiment, a storage unit is a circular buffer. A storage unit may manage a single context, i.e., a MAC operation by a single PE in a convolution operation round. The storage unit stores some or all of the input channels for the context. Alternatively, a storage unit may manage multiple contexts in a convolution operation round. In an example, a storage unit may have a storage limit of up to a predetermined number of (e.g., 64 or other numbers) input channels, i.e., the storage unit can store up to the predetermined number of input channels at a time. Existing data need to be removed to store new data in the storage unit. In some embodiments, all the storage units in a databank store data are used to store contexts for a convolution operation round. In other embodiments, one or more storage units in a databank store data may be vacant (i.e., store no data) for a convolution operation round but may store data for a different round. More details regarding the datastore 240 are provided below in conjunction with FIG. 4.

The reading modules 250 read data from the datastore 240 into the PE array 210. In some embodiments, the number of reading modules 250 is equal to or more than the number of databanks. A reading module 250 may be associated with a reading route that be connected to a single databank for a convolution operation round so that the reading module 250 can access the databank to read data from the databank for the convolution operation round. In some embodiments, the reading route of a reading module 250 can be connected to different databanks in different convolution operation rounds, i.e., the reading module 250 can have access to different databanks in different convolution operation rounds, which provide a flexible databank access pattern for the reading module 250. In some embodiments (e.g., embodiments where the convolution operation is a N×N convolution, where N is an integer greater than 1), the data that a reading module 250 needs to access for different rounds of the convolution operation can be stored in different databanks. By providing the reading module access to the different databanks, the flexible databank access pattern can facilitate data reuse in these databanks. In contrast, in a scenario where a reading module 250 has access to a single databank in different convolution operation rounds, the data in the single databank may have to be changed for every round, which minimizes data reuse.

In some embodiments, a reading module 250 access a databank in a first round of a convolution operation to read contexts to be used by a PE column in the first round, but accesses a second databank in a second round (e.g., a round subsequent to the first round) to read different contexts to be used by the PE column in the second round. The second databank stores the same data in both rounds so that the data is reused, which avoids a writing module 230 to reload the second databank for the second round. The same data in the second databank can be reused again in a third round (e.g., a round subsequent to the second round) by a different reading module 250, which further improves the reuse rate of the data. That way, the same data can be reused multiple times in the convolution operation. Also, the reading module 250, which reuses the data in the second databank in the second round, can access a third databank in a third round. The data in the third databank may be the same data that is stored in the third databank for the first and/or second round, that way the reading module 250 can reuse data multiple times in the convolution operation. The flexible databank access pattern of the reading modules 250 can be controlled by the controlling module 260, which is described below.

In some embodiments, a reading module 250 is coupled to a PE column in the PE array, e.g., the reading module 250 is connected to a loading route of the PE column. In some embodiments, the number of reading modules 250 is equal to or more than the number of PE columns in the PE array 210. Each reading module 250 may correspond to a different PE column. The coupling between a reading module 250 to a PE column may be fixed in a convolution operation, i.e., in every round of the convolution operation, the reading module 250 transfers data to the same PE column.

The reading modules 250 may read data from databanks in accordance with instructions ("reading instructions") from the controlling module 260. A reading instruction may specify which databank that reading module 250 may access for a particular round. In some embodiments, a reading instruction also indicates a mode of a storage unit and the reading module 250 may adjust the mode of the storage unit, e.g., after it finishes reading data from the storage unit, based on the reading instruction. For instance, the reading instruction may specify that the storage unit should remain in a reuse mode after the reading by the reading module 250 and the reading module 250 would set the storage unit to the reuse mode accordingly. As another example, the reading instruction may specify that the storage unit should remain in a final mode after the reading by the reading module 250 and the reading module 250 would set the storage unit to the final mode accordingly.

The controlling module 260 controls the writing modules 230, datastore 240, and reading modules 250 to maximize data reuse and to minimize memory accesses in a convolution operation. The controlling module 260 may be implemented in hardware, software, or a combination of both. In some embodiments, a portion or all of the controlling module 260 may be implemented in the writing modules 230, the datastore 240, or the reading modules 250.

The controlling module 260 may control the writing modules 230, datastore 240, or reading modules 250 based on characteristics of convolution operations of the DNN layer, characteristics of the PE array 210, characteristics of the datastore 240, or some combination thereof. The characteristics of a convolution operation include, for example, input dimension (e.g., n×n, where n is an integer), number of input channels, filter size (e.g., f×f, where f is an integer), padding, stride direction, other characteristics of the convolution operation, or some combination thereof. The characteristics of the PE array 210 may include the number of PE columns, the number of PE rows, processing power of PEs, other characteristics of the PE array 210, or some combination thereof. The characteristics of the datastore 240 may include the number of databanks, the number of storage unit in each databank, the size of each storage unit (e.g., the number of input channels each storage unit can store), other characteristics of the datastore 240, or some combination thereof.

As noted above, the controlling module 260 may provide writing instructions to the writing modules 230 for loading data from the memory 205 into the datastore 240, and provide reading instructions to the reading modules 250 for loading data from the datastore 240 into the PE array 210. In some embodiments, the controlling module 260 provides flexible writing and reading patterns to the writing modules 230 and the reading modules 250, i.e., the writing modules 230 may write data into different storage units in different rounds of a convolution operation and the reading modules 250 may read data from different storage units in different rounds of a convolution operation.

The controlling module 260 may use a "sliding window pattern" to facilitate the flexible writing or reading patterns. The sliding window pattern may be in a databank level and may be based on the sequence of the databanks. In an example, the writing modules 230 may write data into the first databank (or a portion of the first databank) in the first round, write data into the second databank in the second round, and write data into the third databank in the third round, i.e., the writing modules 230 "slide" through these databanks. In another example, a reading module 250 may access the first databank in the first round, access the second databank in the second round (the data in the second databank is the same data for the first round), and access the third databank in the third round (the data in the third databank is the same data for the second round or even the first round), i.e., the reading module "slides" through some or all of the databanks. Different reading modules 250 may have different sliding window patterns. For instance, a reading module 250 may slide through more databanks than another reading module 250, etc. More details regarding flexible writing and reading patterns are described below in conjunction with FIGS. 6A-E, FIG. 7, and FIG. 8.

The controlling module 260 facilitates flexible operation modes of individual storage units to allow reuse of data in the storage units. As noted above, a storage unit may have different operation modes, such as a reuse mode, where the existing data in the storage unit will be reused and the storage unit does not need to be reloaded, and a final mode, where the existing data in the storage unit will not be reused and the storage unit needs to be reloaded with new data. The operation mode of a storage unit informs the writing modules 230 whether to write new data into the storage unit. The controlling module 260 may instruct reading module(s) 250 that access the storage unit to change the operation mode of the storage unit, e.g., from the reuse mode to final mode, when needed. The controlling module 260 may determine whether a storage unit should operate in the reuse mode or final mode, e.g., based on the rounds of the convolution operation and contexts needed for the rounds.

The controlling module 260 may also facilitate a flexible arrangement of the storage units in the datastore 240 to further reduce memory accesses by the writing modules 230 and improve data reuse by the reading modules 250. In some embodiments, the controlling module 260 controls a layout of the datastore 240 based on size of contexts and storage capacity of the datastore. For instance, the controlling module 260 allocates the contexts to the storage units and can control the allocation based on sizes of the contexts and storage limit of the storage units. For instance, the controlling module 260 determines the rounds of a convolution operation and identify the contexts needed for each round. The controlling module 260 may compare a size of a context (e.g., the number of input channels in the context) with a storage limit of a storage unit (e.g., the maximum number of input channels the storage unit can store). The controlling module 260 may allocate a single storage unit to a single context, e.g., when the size of the context is equal to or smaller than the storage limit of the storage unit. In examples where the size of the context is larger than the storage limit of the storage unit, the controlling module 260 may "fuse" multiple storage units into a combined unit and allocate the combined unit to the context. In examples where the controlling module 260 determines that the storage unit has sufficient capacity to store multiple contexts, the controlling module 260 may allocate the storage unit to multiple contexts and these contexts share the single storage unit.

The fusing or sharing of the storage units can improve data reuse rate (e.g., the number of times data is reused) in the convolution operation. For instance, when the size of the context is larger than the storage limit of the storage unit but a context can just take one storage unit, the context has to be loaded into the storage unit through multiple accesses to the memory (each access is for a portion of the context), and the previous data loaded in a previous round is removed when new data is loaded into the storage unit in a new round. That way, the previous data cannot be reused in the new round. In contrast, when the whole context is loaded into a combined unit, the number of accessing the memory is reduced to one. Also, the whole context is present during the rounds the context would be used for MAC operations. Similarly, when the size of the context is smaller than the storage limit of the storage unit, the number of memory accesses can be reduced but the data reuse rate can be increased by storing multiple contexts in a single storage unit. More details regarding fusing and sharing storage units are described below in conjunction with FIGS. 7A and 7B and FIG. 8.

Figure 3A:
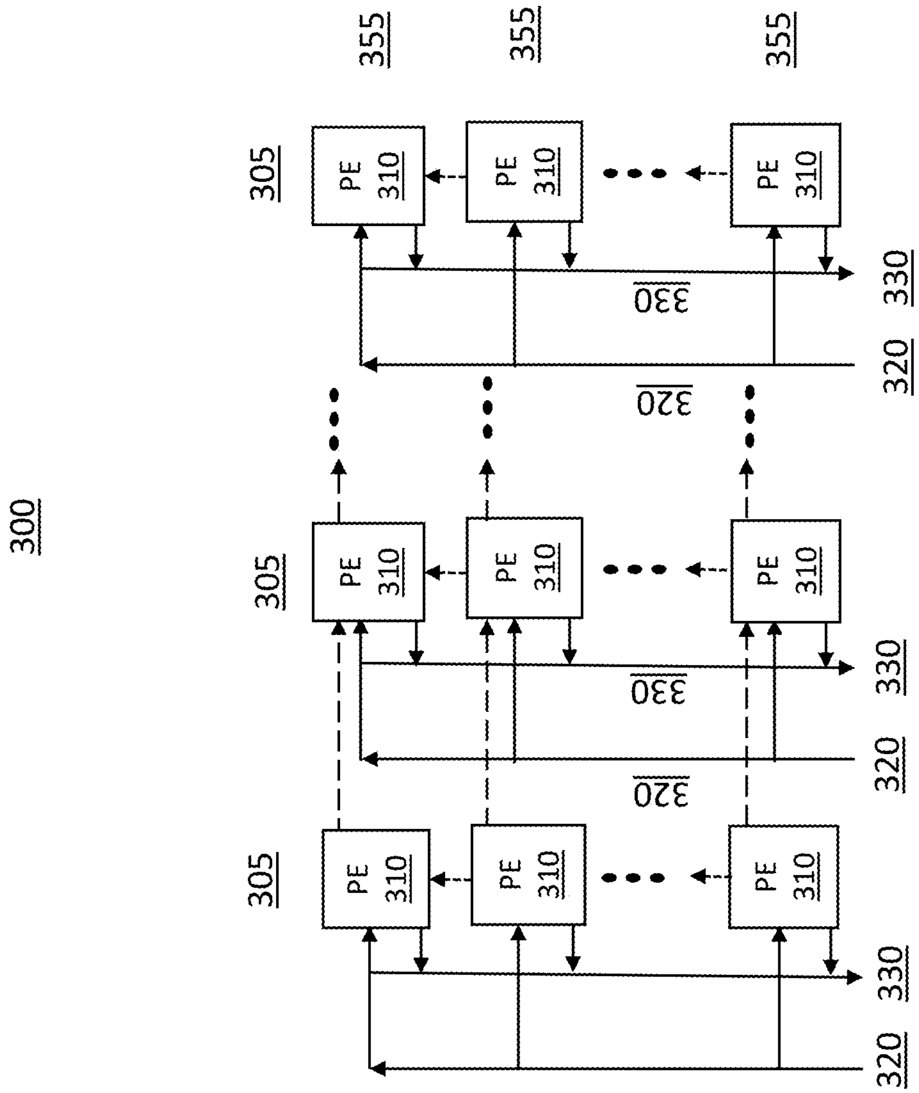
FIG. 3A illustrates a processing element (PE) array, in accordance with various embodiments.

FIG. 3A illustrates a PE array 300, in accordance with various embodiments. The PE array 300 may be an embodiment of the PE array 210 in FIG. 2. The PE array 300 may be a DNN layer (e.g., a convolutional layer) or a portion of a DNN layer. The PE array 300 performs MAC operations, e.g., for a convolution operation or activation operation. The PE array 300 includes a plurality of PEs 310 (individually referred to as "PE 310") that are arranged in columns 305 (individually referred to as "column 305") and rows 355 (individually referred to as "row 355"). In other embodiments, the PE array 300 includes other components, such as buffers for storing data to be used by the PEs 310 to perform the MAC operations. The PE array 300 may also include a distribution unit for distributing data stored in the SRAM to the buffers.

The PEs 310 receive input and weights of the DNN layer and generates output of the layer through MAC operations. The PEs 310 may also be referred to as neurons in the DNN. Each PE 310 may receive a context, which may include one or more input channels, and a weight for a MAC operation. The input signal, e.g., is a portion of the input (e.g., an input feature map) to the layer. The values of the weights are determined during the process of training the DNN. The contexts and weights can be divided and assigned to the PEs 310 based on sparsity bitmaps. In some embodiments, sparsity decoding and alignment have been done before the contexts are provided to the PEs 310.

A PE 310 performs a multiply operation on a context and a weight and generates an output signal. The PEs 310 are connected to each other, as indicated by the dash arrows in FIG. 3. The output signal of an PE 310 is sent to many other PEs 310 (and possibly back to itself) as input signals via the interconnections between PEs 310. The output signal of an PE 310 may incorporate the output signals of one or more other PEs 310 through an accumulate operation of the PE 310.

In the embodiment of FIG. 3, the contexts and weights may be distributed to the PEs 310 based on the columns 305. As shown in FIG. 3, each column 305 has a loading route 320, through which contexts or weights are loaded to the column 305. A loading route 320 may be connected to a reading module (e.g., a reading module 250). The connection between a loading route 320 and a reading module may be fixed in a convolution operation, i.e., the column 305 receives data from the same reading module for different rounds of the convolution operation.

Each column 305 also has a draining route 330. The draining route 330 may be coupled to a memory (e.g., the system memory 205) for sending output signals of the column 305 to the memory. In some embodiments, the draining route 330 transfers data to upper memory hierarchies, e.g., a SRAM, through a drain operation.

Figure 3B:
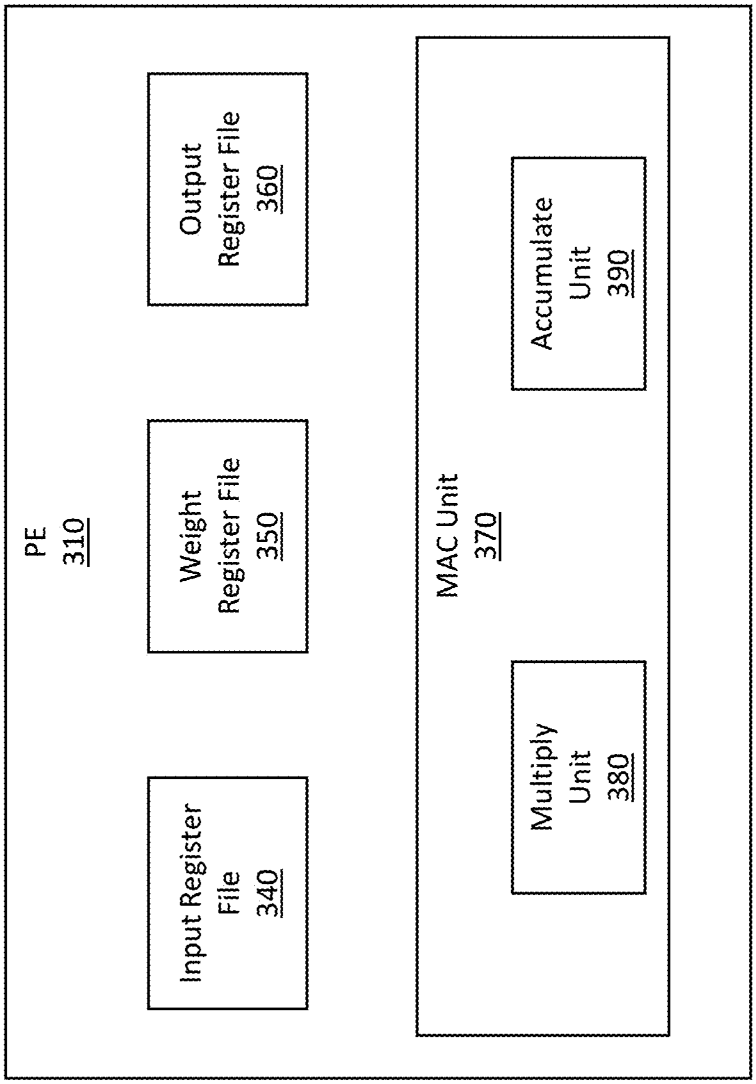
FIG. 3B is a block diagram of a PE, in accordance with various embodiments.

FIG. 3B is a block diagram of a PE 310, in accordance with various embodiments. The PE 310 in FIG. 3B includes an input register file 340, a weight register file 350, an output register file 360, and a MAC unit 370. In other embodiments, the PE 310 may include fewer, more, or different components.

The input register file 340 temporarily stores input signals (e.g., contexts) received by the PE 310. The input feature data may include input feature data and output signals from other PEs 310. The weight register file 350 temporarily stores weights received by the PE 310. The output register file 360 temporarily stores output signals generated by the PE 310. For purpose of illustration and simplicity, the PE 310 in FIG. 3B includes one input register file 340, one weight register file 350, one output register file 360. In other embodiments, a PE 310 may include multiple register files for each type of data.

The MAC unit 370 performs MAC operations on data in the input register file 340 and weight register file 350. The MAC unit 370 includes a multiply unit 380 and an accumulate unit 390. The multiply unit 380 performs multiply operations on input feature data in the input register file 340 and weights in the weight register file 350. The amount of time needed by the multiply unit 380 for a multiple operation depends on the sparsity level of the weights used in the multiple operation. If the weights are denser (i.e., the sparsity level is lower), the multiply unit 380 needs more time to perform the multiple operation. The accumulate unit 390 performs accumulate operations on the output of the multiply unit 380 and outputs signals from other PEs. The output of the accumulate unit 390 is the output signal of the PE 310.

Example Datastore

Figure 4:
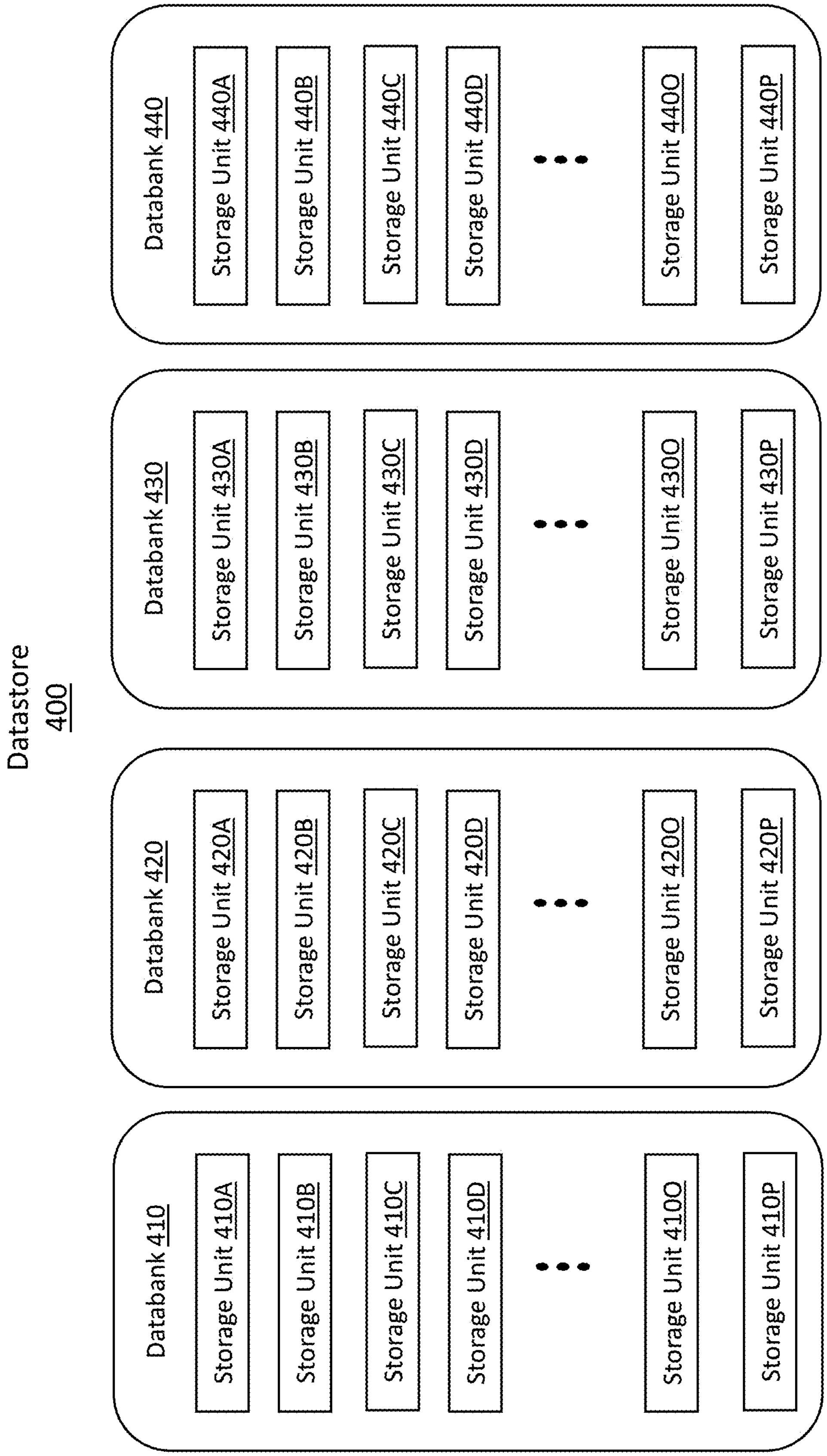
FIG. 4 illustrates a layout of a datastore, in accordance with various embodiments.

FIG. 4 illustrates a layout of a datastore 400, in accordance with various embodiments. The datastore 400 may be an embodiment of the datastore 240 in FIG. 2. As shown in FIG. 4, the datastore 400 includes four databanks 410, 420, 430, and 440. Each databank includes 16 storage units 410A-P, 420A-P, 430A-P, or 440A-P. In other embodiments, the datastore 400 may include a different number of databanks, and a databank may include a different number of storage units.

In some embodiments, a databank may be coupled to multiple reading modules (e.g., reading modules 250) in a convolution operation. In a single round of the convolution operation, the databank may be coupled to a single reading module. The databank may store contexts for a PE column (e.g., a column 305) to perform MAC operations. In an example, for a single databank, the number of storage units that store contexts for a convolution operation round may equal to the number of PEs that perform MAC operations in the corresponding PE column. The contexts may be retrieved by the reading module in an order, e.g., the order the storage units are arranged in the databank. For instance, the reading module reads a single storage unit at a time. The reading module may load the storage unit to a PE before it reads the next storage unit.

A storage unit may be accessed individually. In some embodiments, a storage unit stores a single context at a time. The storage unit may also store a sparsity bitmap for the context so that the reading module accessing the storage unit can perform sparsity decoding and sparsity alignment before the reading module transfers the context to a PE. In other embodiments, a storage unit may store a portion of a context or multiple contexts. In embodiments where a storage unit stores a portion of a context, the storage unit may store a sparsity bitmap for the whole context. Alternatively, the storage unit does not store the sparsity bitmap and the sparsity bitmap is stored in another storage unit that stores another portion of the context. In embodiments where a storage unit stores multiple contexts, the storage unit may store the sparsity bitmap for all the contexts. A storage unit may be a buffer, such as a circular buffer. A storage unit has a storage limit, but different storage units may have the same or different storage limits.

Example Controlling Module

Figure 5:
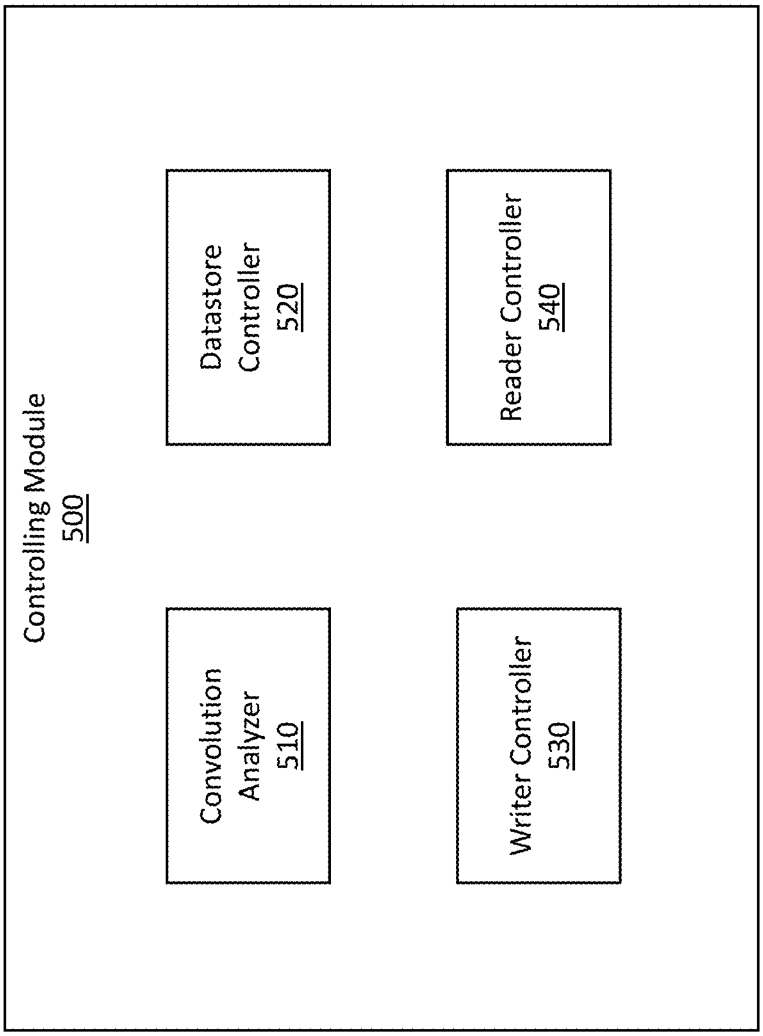
FIG. 5 is a block diagram of a controlling module, in accordance with various embodiments.

FIG. 5 is a block diagram of a controlling module 500, in accordance with various embodiments. The controlling module 500 is an embodiment of the controlling module 260 in FIG. 2. As shown in FIG. 5, the controlling module 500 includes a convolution analyzer 510, a writer controller 530, and a reader controller 540. In some embodiments, the controlling module 500 may include more, fewer, or other components. Also, functions of a component, which are described below, may be implemented in one or more other components.

The convolution analyzer 510 analyzes characteristics of a convolution operation of a DNN layer. The characteristics of a convolution operation include, for example, input dimension (e.g., n×n, where n is an integer), number of input channels, filter size (e.g., f×f, where f is an integer), padding, stride direction, rounds in the convolution operation, other characteristics of the convolution operation, or some combination thereof.

The convolution analyzer 510 may determine the sequence of rounds in the convolution operation based on the weight matrix and strides of the convolution operation. In an example, the convolution analyzer 510 may determine the number of rounds in the convolution operation based on the filter size (i.e., size of the weight matrix). The number of convolution operation rounds may be a product of the number of columns in the weight matrix and the number of rows in the weight matrix. For instance, for a 3×3 weight matrix, the number of convolution operation rounds would be nine. The convolution analyzer 510 may also determine strides of the convolution operation, e.g., whether the convolution operation strides through rows first then strides through columns, or the other way. Based on the number of rounds and the strides, the convolution analyzer 510 can identify each convolution operation round and the weight for each convolution operation round.

The convolution analyzer 510 may also determines contexts for each round in the convolution operation. A context is a portion of the input feature map of the DNN layer, which may be a convolutional layer. The context includes one or more input channels for a single MAC operation performed by a single PE. The context may include all the input channels needed by the PE to perform the MAC operation. A context may be represented by coordinates in a two-dimensional or three-dimensional system. For instance, a context may be referred to as (X,Y) or (X, Y, Z), where X, Y, and Z are integers.

In some embodiments, the convolution analyzer 510 may determine a distribution pattern of the contexts in the rounds of the convolution operation. Based on the distribution pattern, the convolution analyzer 510 may allocate the contexts to the storage units of the datastore in a way that the contexts can be reused. The convolution analyzer 510 may determine a reuse rate for a context, or a group of contexts (e.g., contexts to be written into a same databank). The reuse rate indicates the number of times a context can be used before the context is replaced by a new context in a storage unit. The convolution analyzer 510 may further determine which rounds the same context is used and which round the context needs to be replaced by a new context.

The convolution analyzer 510 may also obtain a sparsity bitmap for a context. The sparsity bitmap specifies sparsity of the context and indicates the zero values and non-zero values in the context. In some embodiments, the convolution analyzer 510 generates the sparsity bitmap, e.g., based on an output of a preceding layer in the DNN. In other embodiments, the convolution analyzer 510 receives the sparsity bitmap from another system. The convolution analyzer 510 may also determine a sparsity level, density level, or both for a context. A sparsity level may indicate a percentage of zero values in the context. A density level may indicate a percentage of non-zero values in the context. The convolution analyzer 510 may determine the sparsity level or density level based on the sparsity bitmap, an output of a preceding layer in the DNN, or other types of information.

The datastore controller 520 controls storage units in the datastore where the contexts can be saved. The datastore controller 520 may identify one or more storage unit to store a context. The datastore controller 520 may also identify a sparsity bitmap of the context, which can be same in a same storage unit as the context itself. In some embodiments, the datastore controller 520 identifies the input channels in each context and compares the storage limit of a storage unit and the number of input channels in a context. The storage limit of a storage unit may be the maximum number of input channels that storage unit can store. In some embodiments where the datastore controller 520 determines that the storage limit of a single storage unit is equal to or higher than the number of input channels of a context, the datastore controller 520 instructs a writing module 230 to write all the input channels of the context into the storage unit.

In other embodiments where the datastore controller 520 determines that the storage limit of a single storage unit is lower than the number of input channels of the DNN layer, the datastore controller 520 may "fuse" multiple storage units into a combined unit and uses the combined unit for a single context. The number of storage units in a combined unit is referred to as the fusing size. In an example where the fusing size is 2, the datastore controller 520 fuses 2 storage units into one combined unit. In another example where the fusing size is 4, the datastore controller 520 fuses 4 storage units into one combined unit. In embodiments where the datastore controller 520 does not combine storage units, it can be considered that the fusing size is one. The datastore controller 520 may use the same fusing size for all the databanks or uses different fusing sizes for different databanks. In an example, a single storage unit can store up to 64 input channels but the number of input channels for the DNN layer is 128, the datastore controller 520 would fuse two storage units into one combined unit so that a single combined unit can store all the input channels for the context. Without fusing the storage units, the context needs to be written into the datastore through two rounds, e.g., half of the input channels are written in each round. That prevents reuse of the first half of the input channels. Thus, even though the fusing operation of the datastore controller 520 can reduce the number of contexts that can be stored in a databank, it reduces the number of times that the writing modules write new data into the databanks and increase reuse of the input channels.

To enable the fusing of multiple storage units, the datastore controller 520 may extend the sparsity tracking capability of each individual datastore. For instance, despite that a storage unit stores 64 input channels, the storage unit can store a sparsity bitmap for up to 246 input channels. That way, one of the fused storage unit may operate as the master sparsity tracker of the combined unit and be used for sparsity tracking for all the storage units in the combined unit. In an example where four storage units are fused to increases the input channel reuse to 256 (i.e., 4 times 64). The sparsity bitmap for this context is tracked and reused through the storage in the first storage unit in the combined unit, while the sparse compressed data is spanning across all the four storage units. In some embodiments, the datastore controller 520 may generate instructions for a reading module 250 to read data from all the storage units in the combined unit, instead of from one storage unit. For instance, the datastore controller 520 may provide the fusing size to the reading module and instruct the reading module to read the same number of storage units.

In some embodiments, the datastore controller 520 may fuse storages units based on sparsity in contexts. The number of input channels may be greater than the product of the number of storage units in each databank and the storage limit of the storage units. For example, the number of storage units in a databank is 8, the storage limit is 64 input channels. The maximum input channels that the whole databank can store is 512, but a context may have more than 512 input channels. In that case, even if all the storage units are fused, there is insufficient storage for storing the context in the databank. The datastore controller 520 may determine the sparsity level in the context and select to store some, instead of all, of the input channels of the context. For instance, the datastore controller 520 selects the input channels with non-zero values and instructs the writing module 230 to write the selected input channels into the databank. The input channels with zero values may not be stored.

In yet other embodiments where the datastore controller 520 determines that the storage limit of a single storage unit is higher than the number of input channels of the DNN layer, the datastore controller 520 may let multiple contexts share a single storage unit and instruct a writing module 230 to write these contexts into the storage unit. The number of contexts in a storage unit is referred to as the sharing size. In an example where the sharing size is 2, a storage unit stores 2 contexts. In another example where the sharing size is 4, a storage unit stores 4 contexts. In embodiments where the datastore controller 520 does not let contexts share a single storage unit, it can be considered that the sharing size is one. The datastore controller 520 may use the same sharing size for all the databanks or uses different sharing sizes for different databanks. In an example, a single storage unit can store up to 64 input channels but the number of input channels for the DNN layer is 16, the datastore controller 520 would let a single storage unit to store four contexts.

In some embodiments, the datastore controller 520 may reduce the number of input channels in a context to make it possible that the context can share a storage unit with one or more other contexts. For instance, the datastore controller 520 determines the sparsity level of the context, e.g., based on the sparsity bitmap of the context, or based on a density map which may be from an output of the previous DNN layer. The datastore controller 520 may reduce the number of input channels in the context by removing input channels with zero values. That way, even if the total number of input channels of the context is too large to allow storage unit sharing, the reduced number of input channel may be small enough for storage unit sharing. In an example where the total number of input channels of a context is 64 and the storage limit of a storage unit is 64 input channels, the storage unit can store a single context but cannot be shared by multiple contexts. But if the sparsity level of the context is 75% (i.e., the density level is 25%), the datastore controller 520 can reduce the number of contexts to 16, i.e., 25% of the total number. That way, a single storage unit can be shared by four contexts.

In the example described above, without sharing the storage unit, the same number of contexts may need to be written into the datastore 240 through 4 rounds. However, with the storage unit sharing, the contexts can be written through one round and can be reused four times. Therefore, the storage unit sharing feature can further improve data reuse rate in the convolution operation. Another benefit of sharing storage unit is that the number of active storage units (i.e., storage units that store contexts) are reduced, which can save processing power of the DNN accelerator.

The datastore controller 520 can track the contexts that share a single storage unit separately. For instance, the sparsity decoding and alignment of these contexts can be performed separately. The storage unit may store a separate sparsity bitmap for a context. In embodiments where the storage space for sparsity bitmaps in the storage unit is limited, the datastore controller 520 may determine the storage size of a sparsity bitmap based on the sharing size. In some embodiments, the datastore controller 520 may divide the total storage size that is available for sparsity bitmaps in the storage unit with the sharing size and evenly distribute a portion of the total storage size to each sparsity bitmap. In other embodiments, the datastore controller 520 may unevenly distribute the total storage size to the sparsity bitmaps, with a sparsity map having a bigger storage size than another sparsity map.

The datastore controller 520 can also control operation modes of an individual storage unit. For instance, the datastore controller 520 may use the context reuse information (e.g., context distribution pattern, context reuse rate, etc.) to determine whether a storage unit operates in a reuse mode or final mode in a round of a convolution operation. The datastore controller 520 can monitor the reuse of the data in a databank and determine when the databank needs to be updated. For instance, the datastore controller 520 may maintain an index (also referred to as "reuse index") for a storage unit in a databank and update the index based on the number of times the storage unit has been accessed by reading modules. The maintaining and updating of the index may be facilitated by reading modules, e.g., under instructions from the reader controller 540. For instance, a reading module may update the index (e.g., by incrementing the index by one), or informs the datastore controller 520 to update the index, after it finishes reading the context in a convolution operation round. The datastore controller 520 compares the index with the reuse rate. The reuse rate indicates the maximum number of times that the context in the storage unit can be used. After the datastore controller 520 determines the index equals the reuse rate, the datastore controller 520 would instruct a writing module, or inform the writer controller 530 to instruct a writing module, to transfer new data into the storage unit.

The writer controller 530 provides instructions to writing modules (e.g., the writing modules 230) for the writing modules to write data from a system memory into a datastore. The writer controller 530 may instruct the writing modules 230 to populate the storage units of the datastore 240 with the contexts that the convolution analyzer 510 have identified for each convolution operation round. In some embodiments, the writer controller 530 identifies the number of PE rows in a PE column and instructs a writing module 230 to write the same number of contexts into the databank corresponding to the PE column. For instance, for a 4×8 PE array 210 and a datastore including four databanks, the writer controller 520 instructs a writing module to write eight contexts into a databank.

In some embodiments, the writer controller 530 instructs a writing module to write data into a storage unit that already has data and the previous data will be replaced by the new data. In other embodiments, the writer controller 530 instructs a writing module to write data into a vacant storage unit, i.e., a storage unit that has no data, so that the previous data may still be reused after the new data is added. That way, the data reuse rate can be improved and the efficiency of the DNN accelerator can be further improved.

In some embodiments, the writer controller 530 provide writing instructions to writing modules based on sparsity information of contexts. For instance, the writer controller 530 may identify zero values and non-zero values in a context, e.g., based on a sparsity bitmap or other information, and instruct a writing module to write the non-zero values into a storage unit but not write the zero values.

The reader controller 540 controls reading modules (e.g., the reading modules 250) to read data from a datastore into a PE array. In some embodiments, the reader controller 540 provides each reading module an access to a databank of the datastore in each round of a convolution operation. The reader controller 540 can facilitate a flexible databank access pattern for the reading modules, e.g., the reader controller 540 may change the databank that a reading module can access for different convolution operation rounds. For instance, the reader controller 540 provide a reading module an access to a first databank in a first round, but provides the reading module an access to a second databank in a second round.

In some embodiments, the reader controller 540 controls the accesses of the reading modules to the databank through one or more switches between the reading modules and databanks. For instance, a reading module is associated with a reading route, which is connected to a databank through a switch. The reader controller 540 may close the switch to provide the reading module an access to the databank and open the switch to prevent the reading module from accessing the databank. A reading module may be associated with a plurality of switches, each of which corresponds to a different databank in the datastore.

In some embodiments, the reader controller 540 uses a sliding window pattern to provide flexible databank accesses to the reading modules. The reader controller 540 may analyze a sequence of the databanks (e.g., the order in which the databanks are arranged) and generate a sliding window pattern for a reading module based on the sequence. In some embodiments, the reader controller 540 may determine a sliding window pattern based on additional information, such as rounds of the convolution operation, context distribution patterns, the PE column into which the reading module load data, etc. In an example, the reader controller 540 instructs a reading module to access the first databank in the first round of a convolution operation, to access the second databank in the second round (the data in the second databank is the same data for the first round), and to access the third databank in the third round (the data in the third databank is the same data for the second round or even the first round), i.e., the reading module "slides" through some or all of the databanks. Different reading modules may have different sliding window patterns. For instance, a reading module may slide through more databanks than another reading module. Also, a reading module may start with a different databank from another reading module.

The reader controller 540 may also provide instructions to reading modules regarding sparsity decoding and sparsity alignment. For instance, the reader controller 540 instructs a reading module to read data in a context based on the sparsity bitmap of the context. In some embodiments (embodiments where a storage unit is shared by multiple contexts), the reader controller 540 instructs the reading modules to read the contexts serially (i.e., read a context at a time) so that a reading module 250 would not read multiple contexts at the same time.

Example Rounds of Convolution Operation

FIGS. 6A-6E illustrates data reuse in a sequence of rounds of a convolution operation, in which data are reused, in accordance with various embodiments. For purpose of illustration, the convolution operation, in the embodiment of FIGS. 6A-6E, has a 3×3 weight matrix, so the convolution operation includes nine rounds. FIGS. 6A-6E shows the first five rounds of the convolution operation.

Figure 6A:
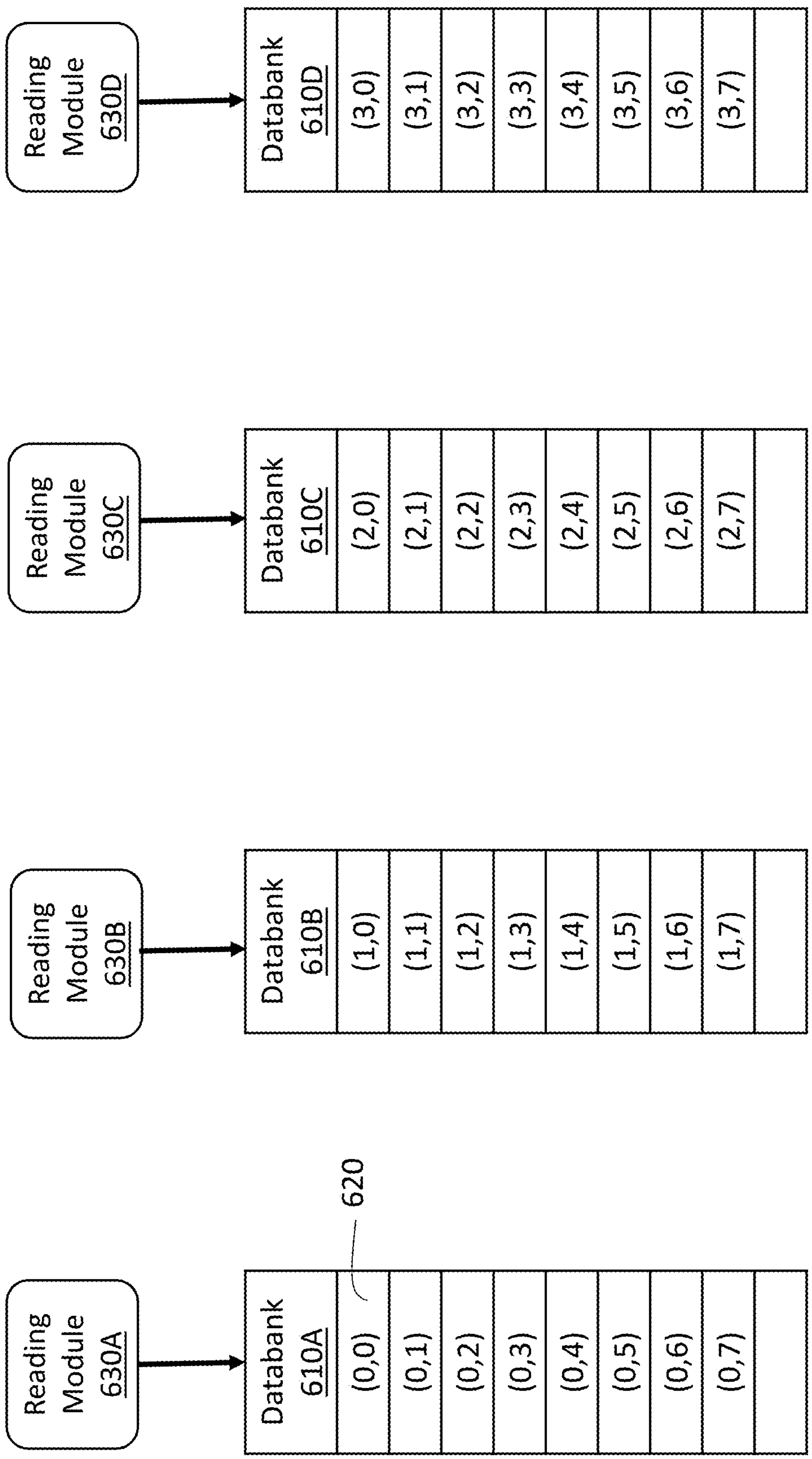
FIGS. 6A-6E illustrate a sequence of rounds of a convolution operation, in which data are reused, in accordance with various embodiments.

FIG. 6A shows distribution of contexts in four databanks 610A-D (collectively referred to as "databanks 610" or "databank 610") in the first round of the convolution operation. The first round may be based on the weight in the first column and first row of the weight matrix. Each databank includes eight storage units 620 (individually referred to as "storage unit 620"), each of which store a context, and a vacant storage unit 620. A context is represented by a two-dimensional coordinate. In the first round four reading modules 630A-D (collectively referred to as "reading modules 630" or "reading module 630") are coupled to the databanks 620. A reading module 630 has an access to a single databank 610 to read contexts in the storage units 620 of the databank 610. Each reading module 630 transfers the contexts it reads to a PE column. A reading module 630 may be a reading module 250. As this is the first round, all the contexts are new data and writing modules have written the new data into the databanks 610 for the first round.

Figure 6B:
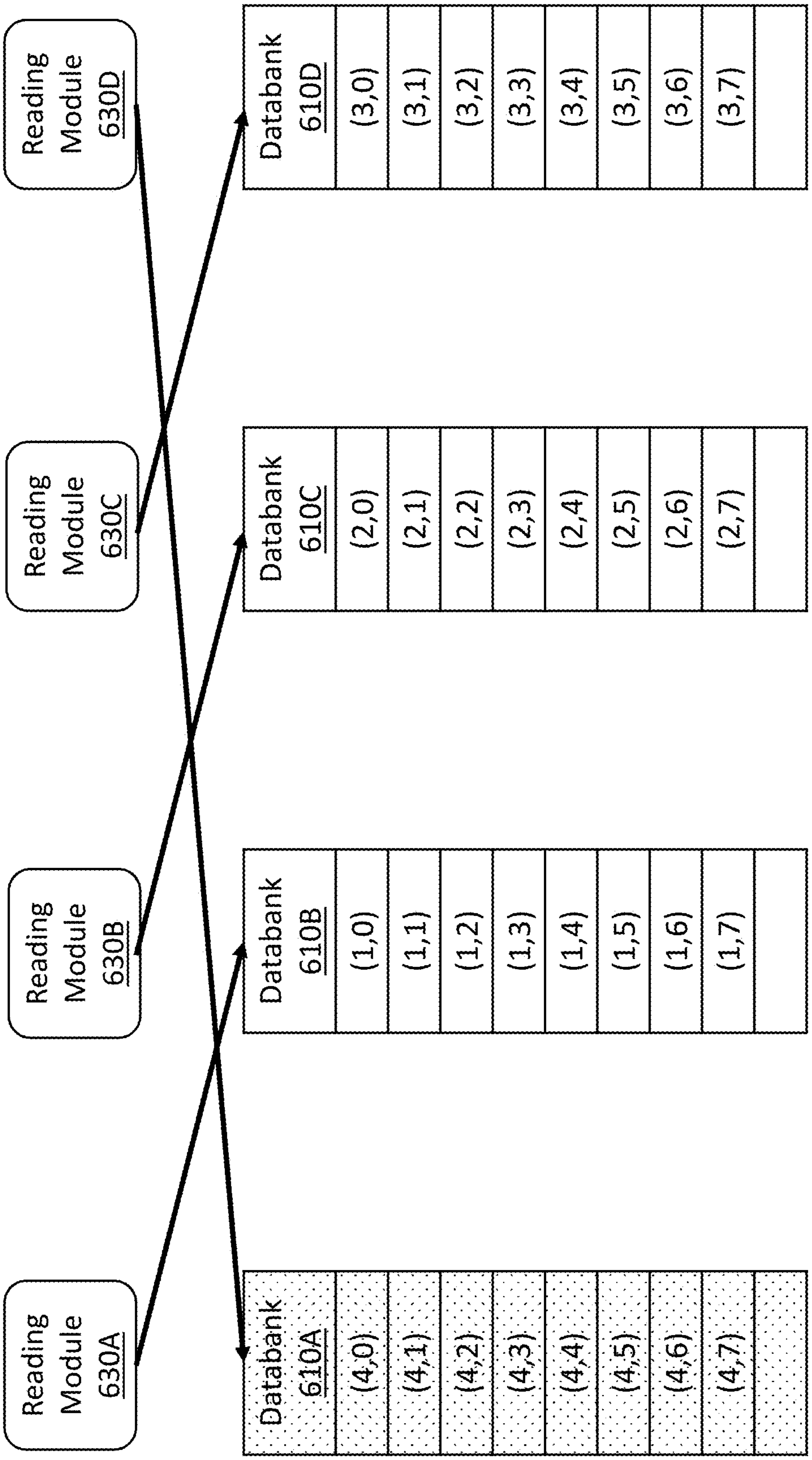

FIG. 6B shows the second round, in which the reading modules 630 are coupled to different databanks 610. For instance, the access of the reading module 630A is changed from the databank 610A to the databank 610B, the access of the reading module 630B is changed from the databank 610B to the databank 610C, the access of the reading module 630C is changed from the databank 610C to the databank 610D, and the access of the reading module 630D is changed from the databank 610D to the databank 610A. The second round may be based on the weight in the first column and second row of the weight matrix. A reading module 630 may still load data into the same PE column as the first round. Due to the change in the accesses of the reading modules 630, the contexts in the databanks 610B-D do not need to be changed in the second round, i.e., these contexts are reused. The databank 610A, on the other hand, receives new contexts, which replace the contexts in the databank 610A in the first round.

Figure 6C:
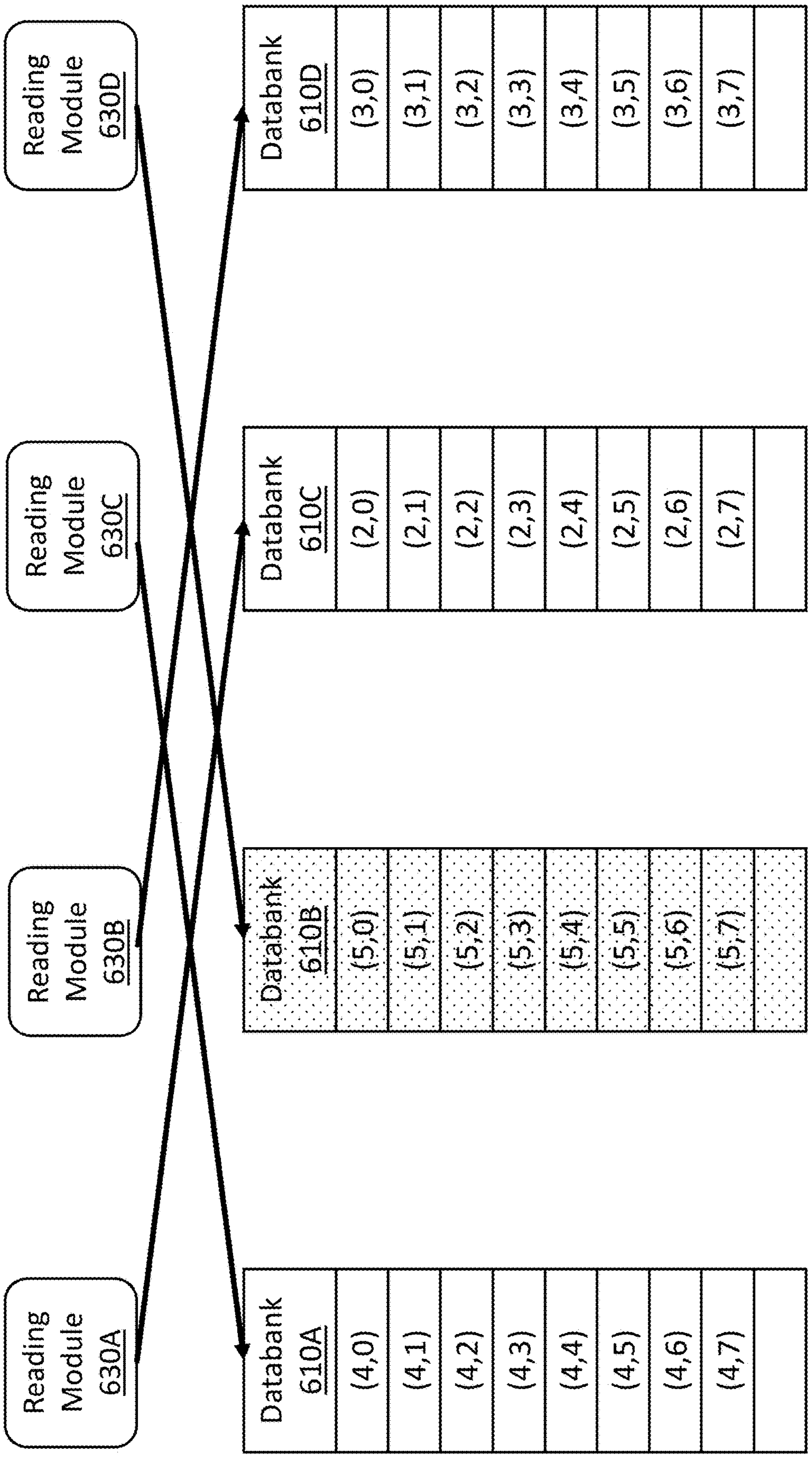

FIG. 6C shows the third round, in which the reading modules 630 are coupled to different databanks 610 from the first round and the second round. For instance, compared with the second round, the access of the reading module 630A is changed from the databank 610B to the databank 610C, the access of the reading module 630B is changed from the databank 610C to the databank 610D, the access of the reading module 630C is changed from the databank 610D to the databank 610A, and the access of the reading module 630D is changed from the databank 610A to the databank 610B. The third round may be based on the weight in the first column and third row of the weight matrix. A reading module 630 may still load data into the same PE column as the first round and the second round. Due to the change in the accesses of the reading modules 630, the contexts in the databanks 610A, 610C, and 610D do not need to be changed in the third round, i.e., these contexts are reused. Particularly, the contexts in the databanks 610C and 610D are still the same as the first round, so these contexts have been used three time. The contexts in the databank 610A remains the same as the second round, so these contexts have been used twice. The databank 610B, on the other hand, receives new contexts, which replace the contexts in the databank 610B in the second round.

The first column of the weight matrix has been finished through the first three rounds. As shown in FIGS. 6A-C, a reading module 630 slide through some of the databanks 620 during the three rounds. For instance, the reading module 630A slides through the databanks 630A-C, the reading module 630B slides through the databanks 630B-D, the reading module 630C slides through the databanks 620C, 620D, and 630A, and the reading module 630D slide through the databanks 620D, 620A, and 620B. The direction of the sliding follows the order in which the databank 620 are arranged. The writing of new contexts also slides through the databanks 620A and 620B, which also follows the order in which the databank 620 are arranged.

Figure 6D:
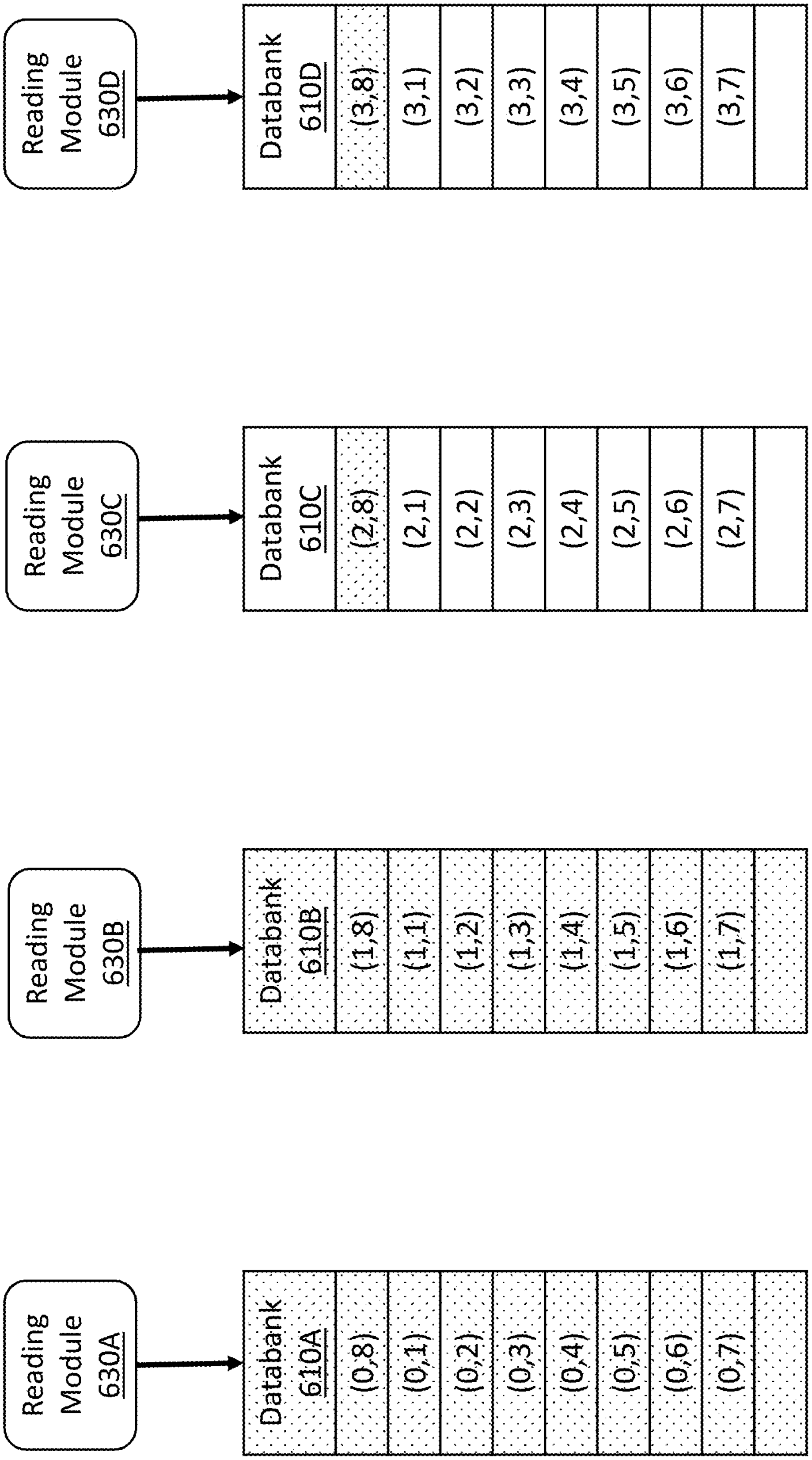

FIG. 6D shows the fourth round, in which the reading modules 630 are coupled to same databanks 610 as the first round. The fourth round may be based on the weight in the second column and first row of the weight matrix. Given the change in the stride of the convolution operation, new contexts are added to all the databanks 610A-D. As shown in FIG. 6D, all the contexts in databank 610A or 610B are changed, versus the databanks 610C and 610D each has one context that is changed from the third round. The other contexts in the databanks 610C and 610D have been used four times.

Figure 6E:
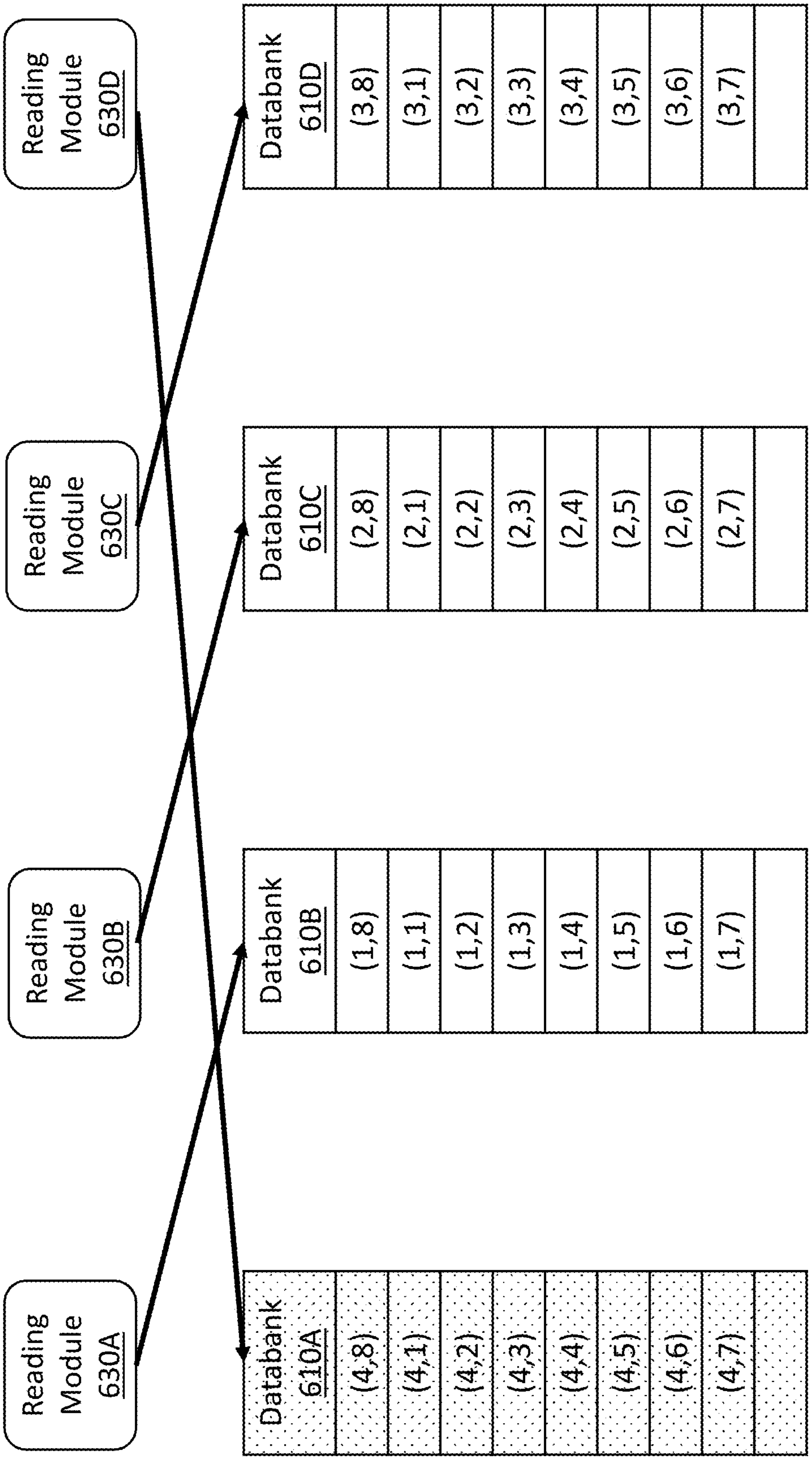

FIG. 6E shows the fifth round, in which the reading modules 630 are coupled to same databanks 610 as the second round. The fifth round may be based on the weight in the second column and second row of the weight matrix. Also, same as the second round, the contexts in the databanks 610B-D do not need to be changed from the fourth round, i.e., these contexts are reused. The databank 610A, on the other hand, receives new contexts, which replace the contexts in the databank 610A in the fourth round.

Even though the other rounds of the convolution operations are not shown in FIGS. 6A-6E, the access pattern of the reading modules 630 follows the sliding window pattern that is shown in FIGS. 6A-6E. Similarly, the writing pattern of writing modules may also follow the sliding window pattern that is shown in FIGS. 6A-6E. For instance, a writing module may write data into the databank 630A in the second round in FIG. 6B, but write data into the databank 630B in the third round in FIG. 6C. In some embodiments, for writing a new context into a databank, a writing module may identify a vacant storage unit in the databank and write the new context into the vacant storage unit, instead of replacing an existing context. The vacant storage unit is a storage unit that has free storage space to store the new context. The vacant storage unit may store no data, or store some data but is not full. That way, the existing context can be retained, which can further improve context reuse. In some embodiments, a reuse factor (e.g., a percentage of reused contexts in the total contexts) of the sliding pattern can be up to 75%, which can significantly reduce memory accesses and improve energy efficiency of the DNN accelerator.

Example Storage Unit Fusion

Figures 7A, 7B:
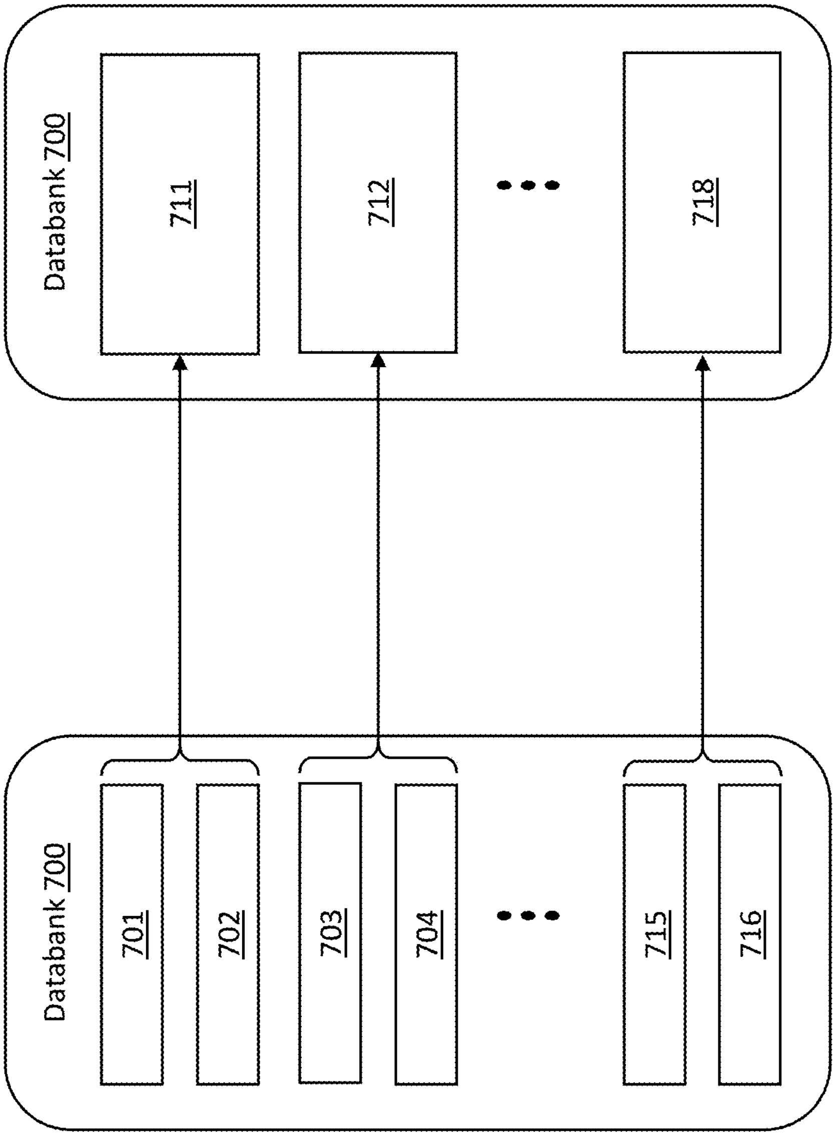
FIGS. 7A and 7B illustrate fusing storage units, in accordance with various embodiments.

FIGS. 7A and 7B illustrate fusing storage units, in accordance with various embodiments. FIG. 7A shows a databank 700 that includes 16 storage units 701-716. In FIG. 7B, the storage units are fused based on a fusing size of two, meaning two storage units are fused into a combined unit. As shown in FIG. 7B, the storage units 701 and 702 are fused to form the combined unit 711, the storage units 703 and 704 are fused to form the combined unit 712, and so on. The databank 700 includes eight combined units 711-718, each of which includes two storage units. Each combined unit may store a single context. One of the storage unit in a combined unit may store a sparsity bitmap of the context. A reading module may retrieve the context from the combined unit based on the sparsity bitmap. The reading module may receive information of the combined unit, e.g., from the controlling module 260, and use the information to retrieve the data. The information may include identify of the storage units in the combined unit, borders of the combined unit, location of the sparsity bitmap in the combined unit, other information about the combined unit or the context, or some combination thereof.

Example Storage Unit Sharing

Figure 8:
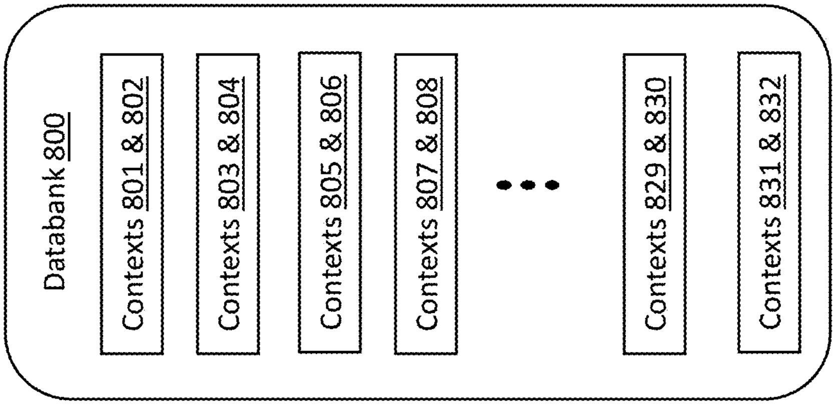
FIG. 8 illustrates sharing storage units, in accordance with various embodiments.

FIG. 8 illustrates sharing storage units, in accordance with various embodiments. FIG. 8 shows a databank 800 that includes 16 storage units 801-716. A storage unit is shared by multiple contexts based on a sharing size of two, meaning two contexts are stored in a single storage unit at a time. The storage unit may also store the sparsity bitmaps of the contexts. Since there are 16 storage units, 32 contexts are saved in the databank 800. A reading module may retrieve the contexts from the storage unit serially, as opposed to retrieve both contexts at the same time. For instance, the reading module may read the first context in the storage unit and the sparsity bitmap of the first context and transfer the first context to a PE column, after which the reading module reads the second context and the sparsity bitmap of the second context and transfer the second context to the PE column. The reading module may receive information of the sharing of the storage units, e.g., from the controlling module 260, and use the information to read the data. The information may include the sharing size, which sparsity bitmap corresponds to which context in a single storage unit, etc.

Example Access Switch

Figure 9:
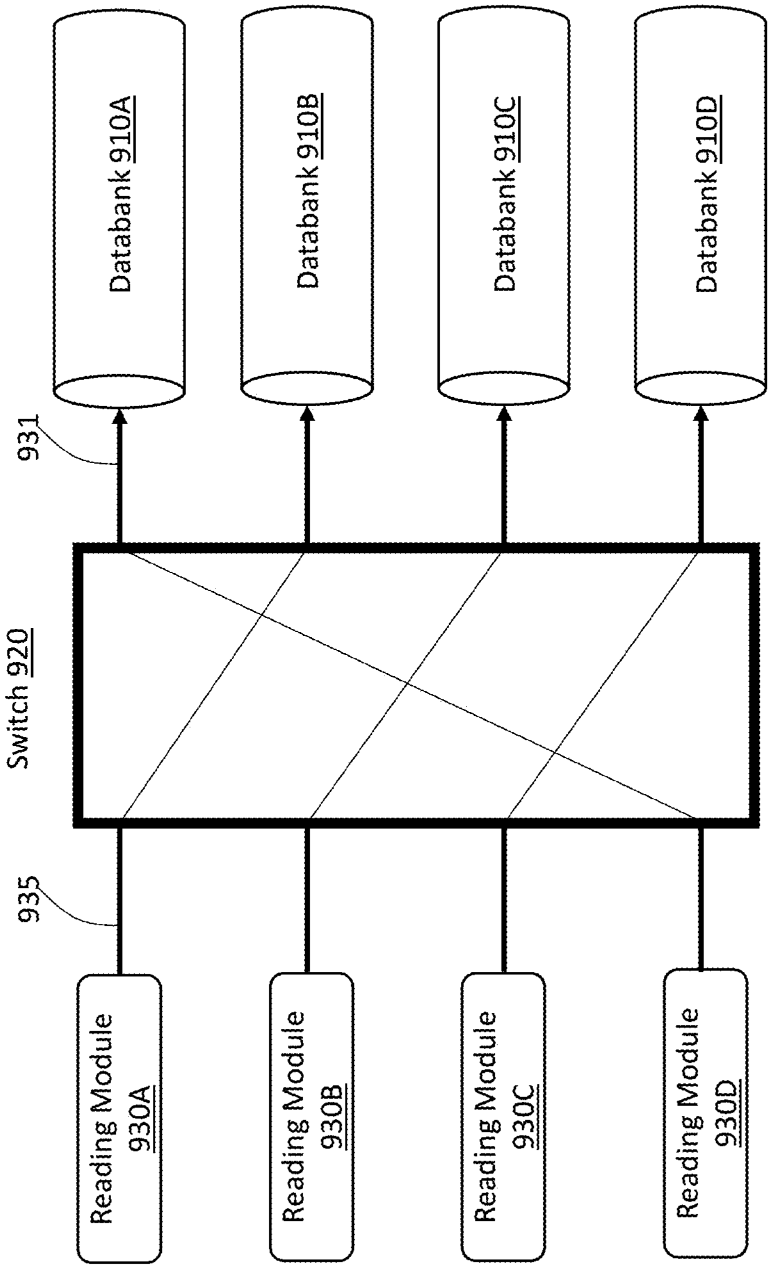
FIG. 9 illustrate switching accesses of reading modules to databanks, in accordance with various embodiments.

FIG. 9 illustrate switching accesses of reading modules 930A-D (collectively referred to as "reading modules 930" or "reading module 930") to databanks 910A-D (collectively referred to as "databanks 910" or "databank 910"), in accordance with various embodiments. A databank may be an embodiment of the databank 610. A reading module 930 may be an embodiment of the reading module 250 or 630.

As shown in FIG. 9, a reading module 930 is associated with a fetching route 935 and a databank 910 has a reading route 915. A reading module 930 has an access to a databank 910 when the fetching route 935 is connected to the reading route 915. The switch 920 controls the connections between the fetching routes 935 and reading routes 915. In an embodiment, the switch 920 is controlled by the controlling module 260 or the reader controller 540. The switch 920 may be a programmable switch, which may be operated based on instructions from the controlling module 260 or the reader controller 540. In some embodiments, the switch 920 facilitates a sliding window pattern, such as the one shown in FIGS. 6A-6E. By using the switch 920 to control the connections between the fetching routes 935 and reading routes 915, the connections can be flexible and is not rigid. As noted above, such flexible accesses of reading modules 930 to databanks 910 improves data reuse in convolution operations.

Example DL Environment

Figure 10:
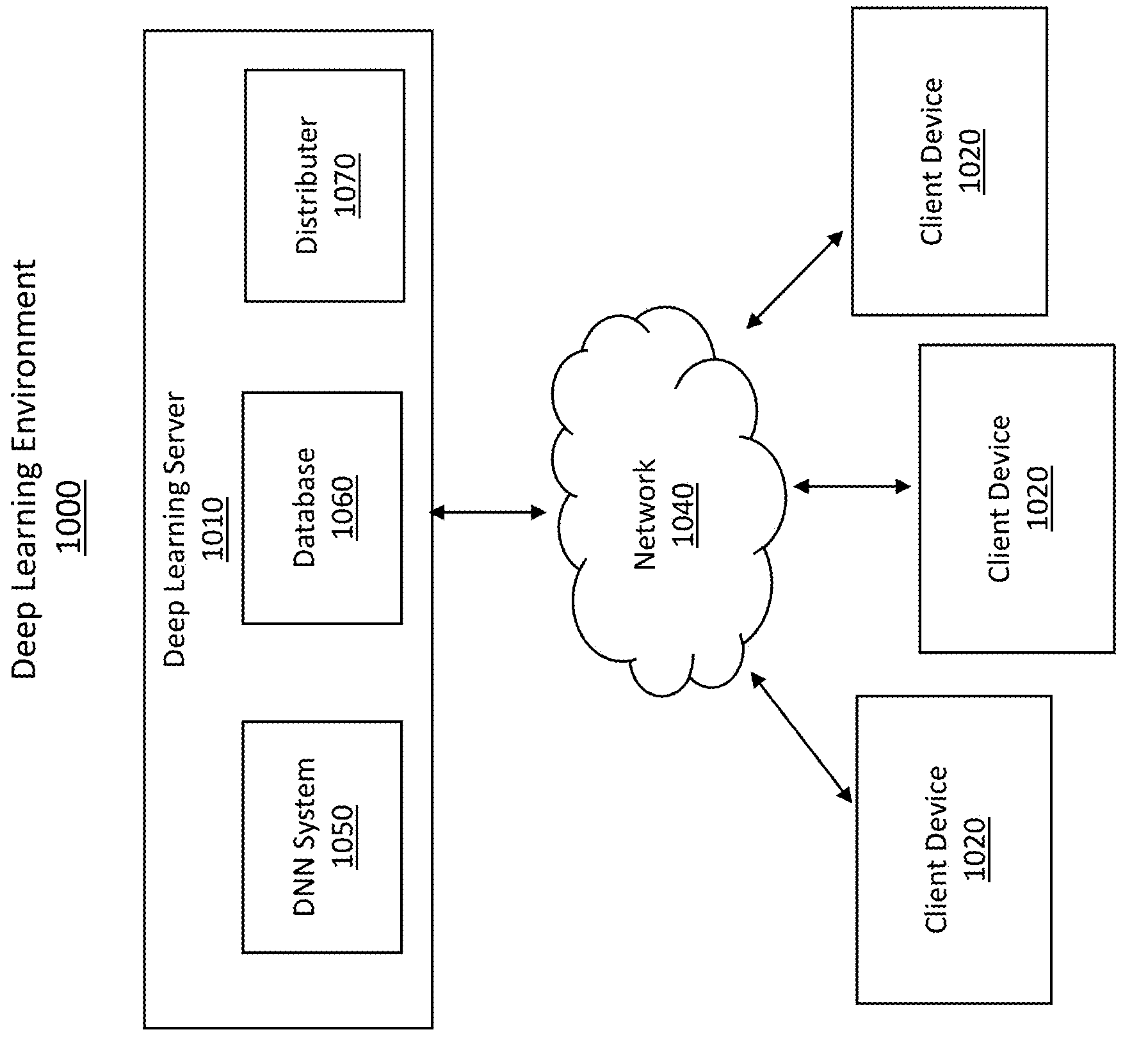
FIG. 10 illustrates a deep learning environment, in accordance with various embodiments.

FIG. 10 illustrates a DL environment 1000, in accordance with various embodiments. The DL environment 1000 includes a DL server 1010 and a plurality of client devices 1020 (individually referred to as client device 1020). The DL server 1010 is connected to the client devices 1020 through a network 1040. In other embodiments, the DL environment 1000 may include fewer, more, or different components.

The DL server 1010 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 1010 can use various types of neural networks, such as DNN, recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 1010 may build DL models specific to particular types of problems that need to be solved. A DL model is trained to receive an input and outputs the solution to the particular problem.

In FIG. 10, the DL server 1010 includes a DNN system 1050, a database 1060, and a distributer 1070. The DNN system 1050 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. The DNN system 1050 also compresses the trained DNNs to reduce the sizes of the trained DNNs. As the compressed DNNs has a smaller size, application of the compressed DNNs requires less time and computing resources (e.g., memory, processor, etc.) compared with uncompressed DNNs. The compressed DNNs may be used on low memory systems, like mobile phones, IOT edge devices, and so on. The DNN system 1050 can also rearrange weight vectors and activation vectors in a trained or compressed DNN to balance sparsity in the weight vectors and activation vectors. More details regarding the DNN system 1050 are described below in conjunction with FIG. 11.

The database 1060 stores data received, used, generated, or otherwise associated with the DL server 1010. For example, the database 1060 stores a training dataset that the DNN system 1050 uses to train DNNs. In an embodiment, the training dataset is an image gallery that can be used to train a DNN for classifying images. The training dataset may include data received from the client devices 1020. As another example, the database 1060 stores hyperparameters of the neural networks built by the DL server 1010.

The distributer 1070 distributes DL models generated by the DL server 1010 to the client devices 1020. In some embodiments, the distributer 1070 receives a request for a DNN from a client device 1020 through the network 1040. The request may include a description of a problem that the client device 1020 needs to solve. The request may also include information of the client device 1020, such as information describing available computing resource on the client device. The information describing available computing resource on the client device 1020 can be information indicating network bandwidth, information indicating available memory size, information indicating processing power of the client device 1020, and so on. In an embodiment, the distributer may instruct the DNN system 1050 to generate a DNN in accordance with the request. The DNN system 1050 may generate a DNN based on the description of the problem. Alternatively or additionally, the DNN system 1050 may compress a DNN based on the information describing available computing resource on the client device.

In another embodiment, the distributer 1070 may select the DNN from a group of pre-existing DNNs based on the request. The distributer 1070 may select a DNN for a particular client device 1030 based on the size of the DNN and available resources of the client device 1030. In embodiments where the distributer 1070 determines that the client device 1030 has limited memory or processing power, the distributer 1070 may select a compressed DNN for the client device 1030, as opposed to an uncompressed DNN that has a larger size. The distributer 1070 then transmits the DNN generated or selected for the client device 1020 to the client device 1020.

In some embodiments, the distributer 1070 may receive feedback from the client device 1020. For example, the distributer 1070 receives new training data from the client device 1020 and may send the new training data to the DNN system 1050 for further training the DNN. As another example, the feedback includes an update of the available computer resource on the client device 1020. The distributer 1070 may send a different DNN to the client device 1020 based on the update. For instance, after receiving the feedback indicating that the computing resources of the client device 1020 have been reduced, the distributer 1070 sends a DNN of a smaller size to the client device 1020.

The client devices 1020 receive DNNs from the distributer 1070 and applies the DNNs to solve problems, e.g., to classify objects in images. In various embodiments, the client devices 1020 input images into the DNNs and uses the output of the DNNs for various applications, e.g., visual reconstruction, augmented reality, robot localization and navigation, medical diagnosis, weather prediction, and so on. A client device 1020 may be one or more computing devices capable of receiving user input as well as transmitting and/or receiving data via the network 1040. In one embodiment, a client device 1020 is a conventional computer system, such as a desktop or a laptop computer. Alternatively, a client device 1020 may be a device having computer functionality, such as a personal digital assistant (PDA), a mobile telephone, a smartphone, an autonomous vehicle, or another suitable device. A client device 1020 is configured to communicate via the network 1040. In one embodiment, a client device 1020 executes an application allowing a user of the client device 1020 to interact with the DL server 1010 (e.g., the distributer 1070 of the DL server 1010). The client device 1020 may request DNNs or send feedback to the distributer 1070 through the application. For example, a client device 1020 executes a browser application to enable interaction between the client device 1020 and the DL server 1010 via the network 1040. In another embodiment, a client device 1020 interacts with the DL server 1010 through an application programming interface (API) running on a native operating system of the client device 1020, such as IOS® or ANDROID™.

In an embodiment, a client device 1020 is an integrated computing device that operates as a standalone network-enabled device. For example, the client device 1020 includes display, speakers, microphone, camera, and input device. In another embodiment, a client device 1020 is a computing device for coupling to an external media device such as a television or other external display and/or audio output system. In this embodiment, the client device 1020 may couple to the external media device via a wireless interface or wired interface (e.g., an HDMI cable) and may utilize various functions of the external media device such as its display, speakers, microphone, camera, and input devices. Here, the client device 1020 may be configured to be compatible with a generic external media device that does not have specialized software, firmware, or hardware specifically for interacting with the client device 1020.

The network 1040 supports communications between the DL server 1010 and client devices 1020. The network 1040 may comprise any combination of local area and/or wide area networks, using both wired and/or wireless communication systems. In one embodiment, the network 1040 may use standard communications technologies and/or protocols. For example, the network 1040 may include communication links using technologies such as Ethernet, 8010.11, worldwide interoperability for microwave access (WiMAX), 3G, 4G, code division multiple access (CDMA), digital subscriber line (DSL), etc. Examples of networking protocols used for communicating via the network 1040 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1040 may be represented using any suitable format, such as hypertext markup language (HTML) or extensible markup language (XML). In some embodiments, all or some of the communication links of the network 1040 may be encrypted using any suitable technique or techniques.

Example DNN System

Figure 11:
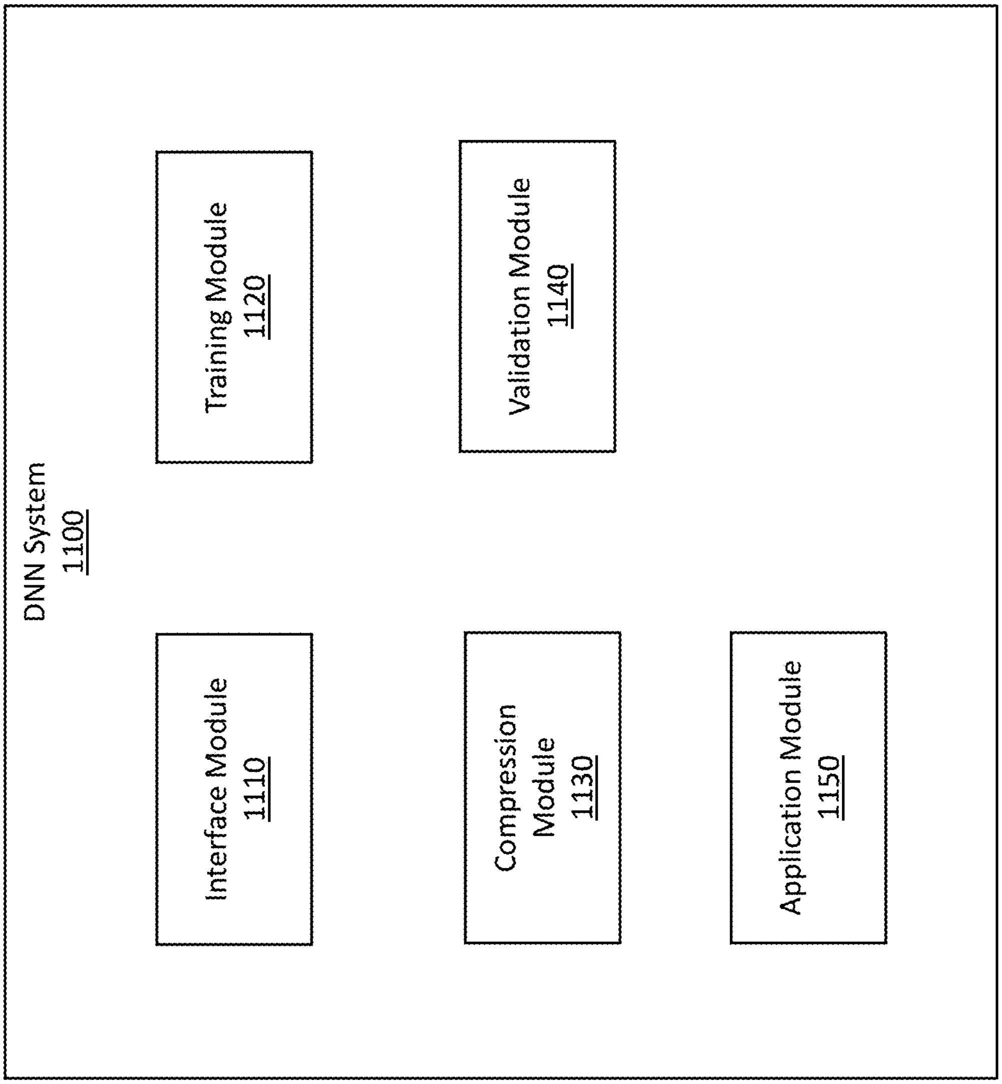
FIG. 11 is a block diagram of a DNN system, in accordance with various embodiments.

FIG. 11 is a block diagram of a DNN system 1100, in accordance with various embodiments. The DNN system 1100 may be an embodiment of the DNN system 1050 or the DNN accelerator 200. The DNN system 1100 trains DNNs. The DNN system 1100 can train DNNs that can be used to solve various problems, such as image classification, learning relationships between biological cells (e.g., DNA, proteins, etc.), control behaviors for devices (e.g., robots, machines, etc.), and so on. The DNN system 1100 includes an interface module 1110, a training module 1120, a compression module 1130, a validation module 1140, and an application module 1150. In other embodiments, alternative configurations, different or additional components may be included in the DNN system 1100. Further, functionality attributed to a component of the DNN system 1100 may be accomplished by a different component included in the DNN system 1100.

The interface module 1110 facilitates communications of the DNN system 1100 with other systems. For example, the interface module 1110 establishes communications between the DNN system 1100 with an external database to receive data that can be used to train DNNs or input into DNNs to perform tasks. As another example, the interface module 1110 supports the DNN system 1100 to distribute DNNs to other systems, e.g., computing devices configured to apply DNNs to perform tasks.

The training module 1120 trains DNNs by using a training dataset. The training module 1120 forms the training dataset. In an embodiment where the training module 1120 trains a DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a tuning subset used by the compression module 1130 to tune a compressed DNN or as a validation subset used by the validation module 1140 to validate performance of a trained or compressed DNN. The portion of the training dataset not including the tuning subset and the validation subset may be used to train the DNN.

The training module 1120 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the DNN. An epoch may include one or more batches. The number of epochs may be 10, 100, 500, 1000, or even larger.

The training module 1120 defines the architecture of the DNN, e.g., based on some of the hyperparameters. The architecture of the DNN includes an input layer, an output layer, and a plurality of hidden layers. The input layer of a DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as rectified liner unit (ReLU) layers, pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

The training module 1120 inputs the training dataset into the DNN and modifies the parameters inside the DNN to minimize the error between the generated labels of objects in the training images and the training labels. The parameters include weights of filters in the convolutional layers of the DNN. In some embodiments, the training module 1120 uses a cost function to minimize the error. After the training module 1120 finishes the predetermined number of epochs, the training module 1120 may stop updating the parameters in the DNN. The DNN having the updated parameters is referred to as a trained DNN.

The compression module 1130 compresses trained DNNs to reduce complexity of the trained DNNs at the cost of small loss in model accuracy. The compression module 1130 converts some or all of the convolutional tensors in a trained DNN into reduced tensors that have reduced dimensions from the corresponding convolutional tensors. The compression module 1130 then integrates the reduced tensors into the trained DNN to reduce the complexity of the trained DNN. In some embodiments, the compression module 1130 prunes a subset of the filters in a convolutional layer to generate a sparse tensor and then decomposes the sparse tensor to generate the reduced tensor of the convolutional layer. The compression module 1130 compresses the trained DNN by removing the convolutional tensor from the network and placing the reduced tensor into the network. After some or all of the convolutional tensor in the trained DNN is removed and their reduced tensors are integrated, a compressed DNN is generated. The compression module 1130 may fine-tune the compressed DNN. For instance, the compression module 1130 uses the training dataset, or a subset of the training dataset, to train the compressed DNN. As the compressed DNN is converted from the pre-trained DNN, the fine-tuning process is a re-training process.

The validation module 1140 verifies accuracy of trained or compressed DNN. In some embodiments, the validation module 1140 inputs samples in a validation dataset into the DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1140 determines may determine an accuracy score measuring the precision, recall, or a combination of precision and recall of the DNN. The validation module 1140 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1140 may compare the accuracy score with a threshold score. In an example where the validation module 1140 determines that the accuracy score of the augmented model is lower than the threshold score, the validation module 1140 instructs the training module 1120 or the compression module 1130 to re-train the DNN. In one embodiment, the training module 1120 or the compression module 1130 may iteratively re-train the DNN until the occurrence of a stopping condition, such as the accuracy measurement indication that the DNN may be sufficiently accurate, or a number of training rounds having taken place.

In some embodiments, the validation module 1140 instructs the compression module 1130 to compress DNNs. For example, the validation module 1140 may determine whether an accuracy score of a compressed DNN is above a threshold score. In response to determining that the accuracy score of a compressed DNN is above a threshold score, the validation module 1140 instructs the compression module 1130 to further compress the DNN, e.g., by compressing an uncompressed convolutional layer in the DNN. In an embodiment, the validation module 1140 may determine a compression rate based on the accuracy score and instructs the compression module 1130 to further compress the DNN based on the compression rate. The compression rate, e.g., is a percentage indicating the reduced size of the DNN from compression.

The application module 1150 applies the trained or compressed DNN to perform tasks. For instance, the application module 1150 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like.

Example Methods of Reusing Data in Convolution Operation

Figure 12A:
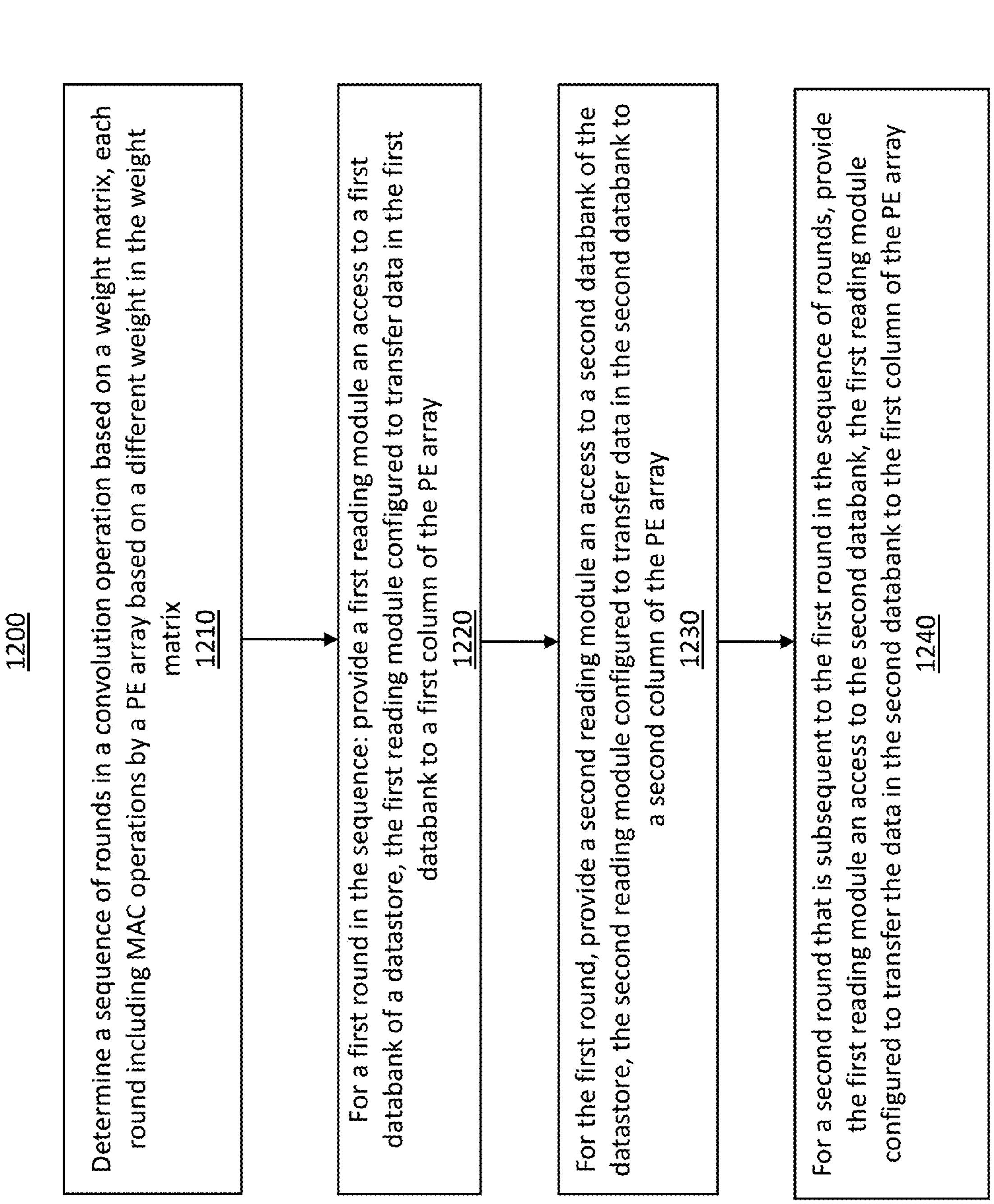
FIG. 12A is a flowchart showing a method of reusing data in a convolution operation, in accordance with various embodiments.

FIG. 12A is a flowchart showing a method 1200 for reusing data in a convolution operation, in accordance with various embodiments. The method 1200 may be performed by the controlling module 260 in FIG. 2. Although the method 1200 is described with reference to the flowchart illustrated in FIG. 12A, many other methods for reusing data in convolution operations may alternatively be used. For example, the order of execution of the steps in FIG. 12A may be changed. As another example, some of the steps may be changed, eliminated, or combined.

The controlling module 260 determines 1210 a sequence of rounds in a convolution operation based on a weight matrix. The weight matrix may be a filter of a DNN layer, e.g., a convolutional layer. Each round in the sequence includes MAC operations by a PE array based on a different weight in the matrix. The PE array includes columns and rows of PEs.

For a first round in the sequence, the controlling module 260 provides 1220 a first reading module an access to a first databank of a datastore. The first reading module is configured to transfer data in the first databank to a first column of the PE array. The data store includes databanks that are configured to store data that the PE array uses to perform the MAC operations. The first databank may include a plurality of storage units. The first reading module is configured to transfer the data in the first databank to the first column by transferring data (e.g., a context) in a storage unit of the first databank to a PE in the first column. The data in the storage unit include input channels to be used by the PE to perform an MAC operation. In some embodiments, the first reading module transfers data in the storage units one by one, e.g., the first reading module first transfer the data in the first storage unit in the first databank, then moves to the second storage unit, then to the third storage unit, and so on.

In some embodiments, the controlling module 260 may divide the plurality of storage units of the first databank into a plurality of subsets of storage units and may instruct the first reading module to transfer data in a subset of storage units to a PE in the first column. The data in the subset of storage units include input channels to be used by the PE to perform an MAC operation. In other embodiments, the controlling module 260 may instruct the first reading module to transfer data in a storage unit of the first databank to a plurality of PEs in the first column. The data in the storage unit include input channels to be used by the plurality of PEs to perform MAC operations.

For the first round, the controlling module 260 also provides 1230 a second reading module an access to a second databank of the datastore. The second reading module is configured to transfer data in the second databank to a second column of the PE array.

For a second round, the controlling module 260 provides 1240 the first reading module an access to the second databank. The second round is subsequent to the first round in the sequence of rounds. The first reading module is configured to transfer the data in the second databank to the first column of the PE array. For the second round, the controlling module 260 may also instruct a writing module to transfer new data from the memory to the first databank. However, the data in the second databank remains the same as the first round. After instructing the writing module to transfer the new data from the memory to the first databank, the controlling module 260 may provide a third reading module an access to the first databank. The third reading module is configured to transfer the new data in the first databank to a third column of the PE array. The third column may be subsequent to the first column and the second column in the PE array.

In some embodiments, the controlling module 260 maintains an index for a storage unit of a plurality of storage units in the second databank. The controlling module 260 may instruct the reading modules to update the index based on a number of times the reading modules have accessed the storage unit. The controlling module 260 may also determine whether the updated index matches a predetermined number (e.g., a reuse rate of the data in the storage unit). In response to determining that the updated index matches the predetermined number, the controlling module 260 may instruct a writing module to transfer new data from a memory to the second databank. In some embodiments, the controlling module 260 may instruct the writing module to identify a vacant storage unit in the second databank and to write the new data into the vacant storage unit.

In some embodiments, the controlling module 260 also instructs writing modules to transfer input data of the DNN layer from a memory to the datastore. The controlling module 260 may instruct a writing module to change data in different databanks of the datastore for different rounds of the convolution operation.

Figure 12B:
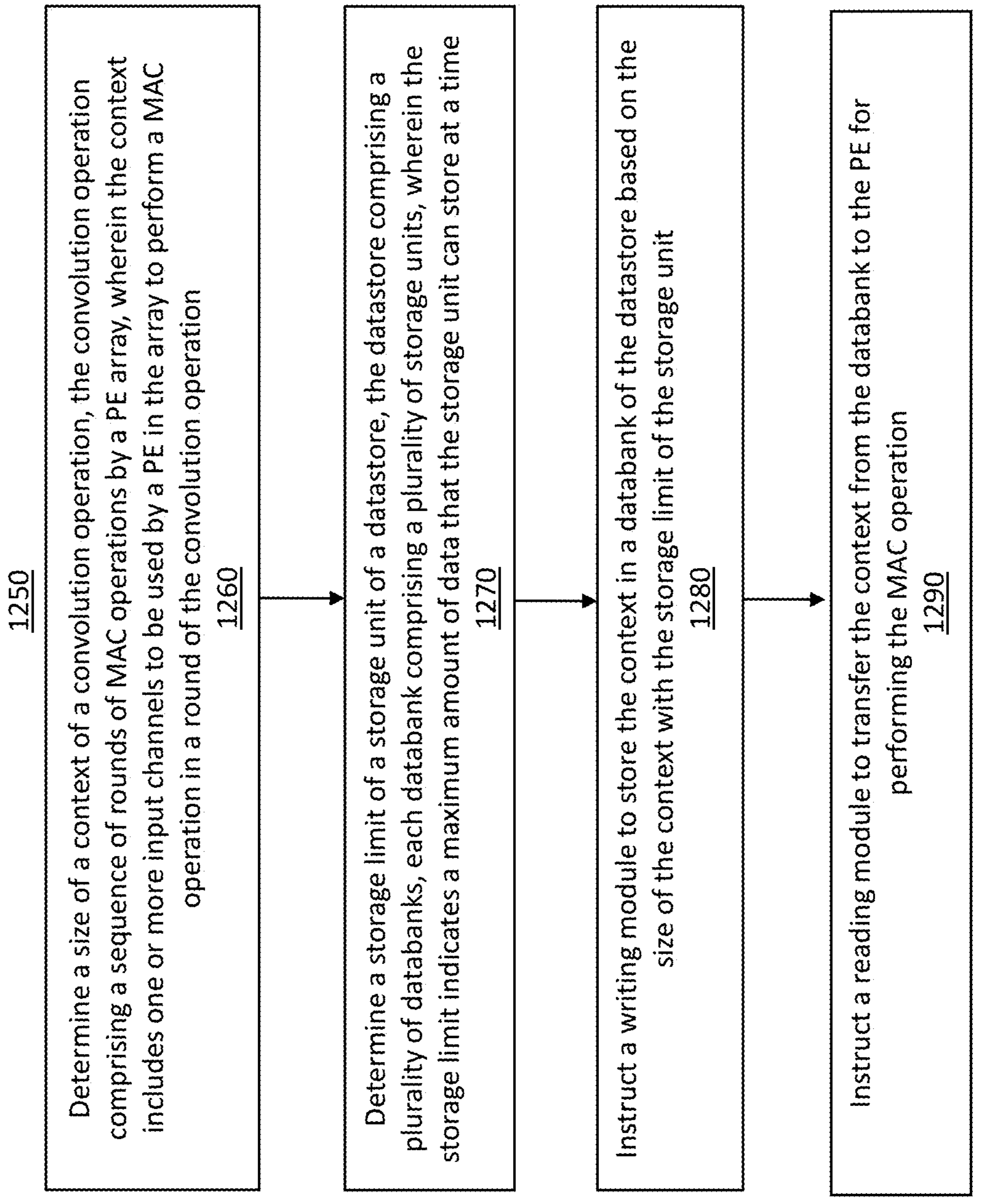
FIG. 12B is a flowchart showing another method of reusing data in a convolution operation, in accordance with various embodiments.

FIG. 12B is a flowchart showing another method 1250 of reusing data in a convolution operation, in accordance with various embodiments. The method 1250 may be performed by the controlling module 260 in FIG. 2. Although the method 1250 is described with reference to the flowchart illustrated in FIG. 12B, many other methods for reusing data in convolution operations may alternatively be used. For example, the order of execution of the steps in FIG. 12B may be changed. As another example, some of the steps may be changed, eliminated, or combined.

The controlling module 260 determines 1260 a size of a context of a convolution operation based on a weight matrix. The convolution operation includes a sequence of rounds. Each round includes MAC operations by a PE array based on a different weight in the matrix. The PE array includes a plurality of PEs. The context includes one or more input channels to be used by a PE in the array to perform a MAC operation in a round of the convolution operation. In some embodiments, the controlling module 260 may determine the size of the context based on non-zero input channels in the context. For example, a context may include one or more input channels having zero values and one or more other input channels having non-zero values. The controlling module 260 determines the size based on the input channels having non-zero values and not based on the input channels having zero values, e.g., the controlling module 260 may determine that the size equals the number of input channels having non-zero values in the context. The controlling module 260 may determine the number of non-zero channels based on a sparsity level or density level of the context. For instance, for a context having a density level of 25% (or a sparsity level of 75%) and have 64 input channels in total, the controlling module 260 may determine that the size of the context is 16, as opposed to 64. The controlling module 260 may determine the sparsity level or density level based on a sparsity bitmap of the context or other information.

The controlling module 260 also determines 1270 a storage limit of a storage unit of a datastore. The datastore includes a plurality of databanks. Each databank includes a plurality of storage units. The storage limit indicates a maximum amount of data that the storage unit can store at a time. In one example, the storage limit indicates a maximum number of input channels the storage unit can store at a time.

The controlling module 260 instructs 1280 a writing module to store the context in a databank of the datastore based on the size of the context with the storage limit of the storage unit. The controlling module 260 also instructs 1290 a reading module to transfer the context from the databank to the PE for performing the MAC operation. In some embodiments (such as embodiments where the controlling module 260 determines the size of the context based on non-zero input channels in the context), the controlling module 260 may instruct the writing module to store the non-zero input channels in the databank and not to store the zero input channels. The controlling module 260 may also instruct the reading module to transfer the non-zero input channels from the databank to the PE.

In some embodiments, the controlling module 260 determines whether the size of the context is larger than the storage limit of the storage unit. In embodiments where the controlling module 260 determines that the size of the context is the same as or substantially same as the storage limit of the storage unit, the controlling module 260 may instruct the writing module to store the context in a single storage unit in the databank and instruct the reading module to transfer the context from the single storage unit. The storage unit may also store a sparsity bitmap of the context. The sparsity bitmap indicates positions of zero values in the context. The sparsity bitmap may include a bit for each input channel of the context. The value of the bit is zero when the input channel has a zero value, and the value of the bit is one when the input channel has a non-zero value.

In some embodiments where the controlling module 260 determines that the size of the context is larger than the storage limit of the storage unit, the controlling module 260 may determine a number (e.g., a fusing size). A product of the number and the storage limit is no smaller than the size of the context. The controlling module may instruct the writing module to store the context in the number of storage units in the databank and may instruct the reading module to transfer the context from the number of storage units in the databank to the PE. In some embodiments, the context is associated with a sparsity bitmap that indicates positions of zero values in the context. The controlling module may instruct the writing module to store the sparsity bitmap in a storage unit of the number of storage units.

In some embodiments where the controlling module 260 determines that the size of the context is smaller than the storage limit of the storage unit, the controlling module 260 may determine a number (e.g., a sharing size). A product of the number and the size of the context is no larger than the storage limit. The controlling module may instruct the writing module to store the context and one or more additional contexts in the storage unit and may instruct the reading module to transfer the context from the storage unit to the PE.

In some embodiments, the contexts are associated with sparsity bitmaps. Each sparsity map indicates positions of zero values in a respective context of the contexts. The controlling module may instruct the writing module to store the sparsity bitmaps in the storage unit. In some embodiments, the controlling module may determine a size of a sparsity map based on the number. For instance, the controlling module may divide a storage size for sparsity bitmaps in the storage unit by the number and use the result of the division as the size of the each sparsity map. In other examples, the controlling module may allocate different sizes to sparsity bitmaps of different contexts. In some embodiments, the controlling module determines a storage size limit for the sparsity bitmaps and the size of a sparsity bitmap is smaller than the storage size limit.

The controlling module may also instruct the reading module to transfer the one or more additional contexts from the storage unit to one or more additional PEs for performing one or more additional MAC operations in the round of the convolution operation. In some embodiments, the controlling module may instruct the reading module to transfer the contexts in the storage unit sequentially, e.g., one by one, as opposed to simultaneously. For instance, the controlling module may instruct the reading module to transfer one of the one or more additional contexts from the storage unit after transferring the context from the storage unit. The PE and the one or more additional PE may be arranged in a same column of the PE array.

Example Computing Device

Figure 13:
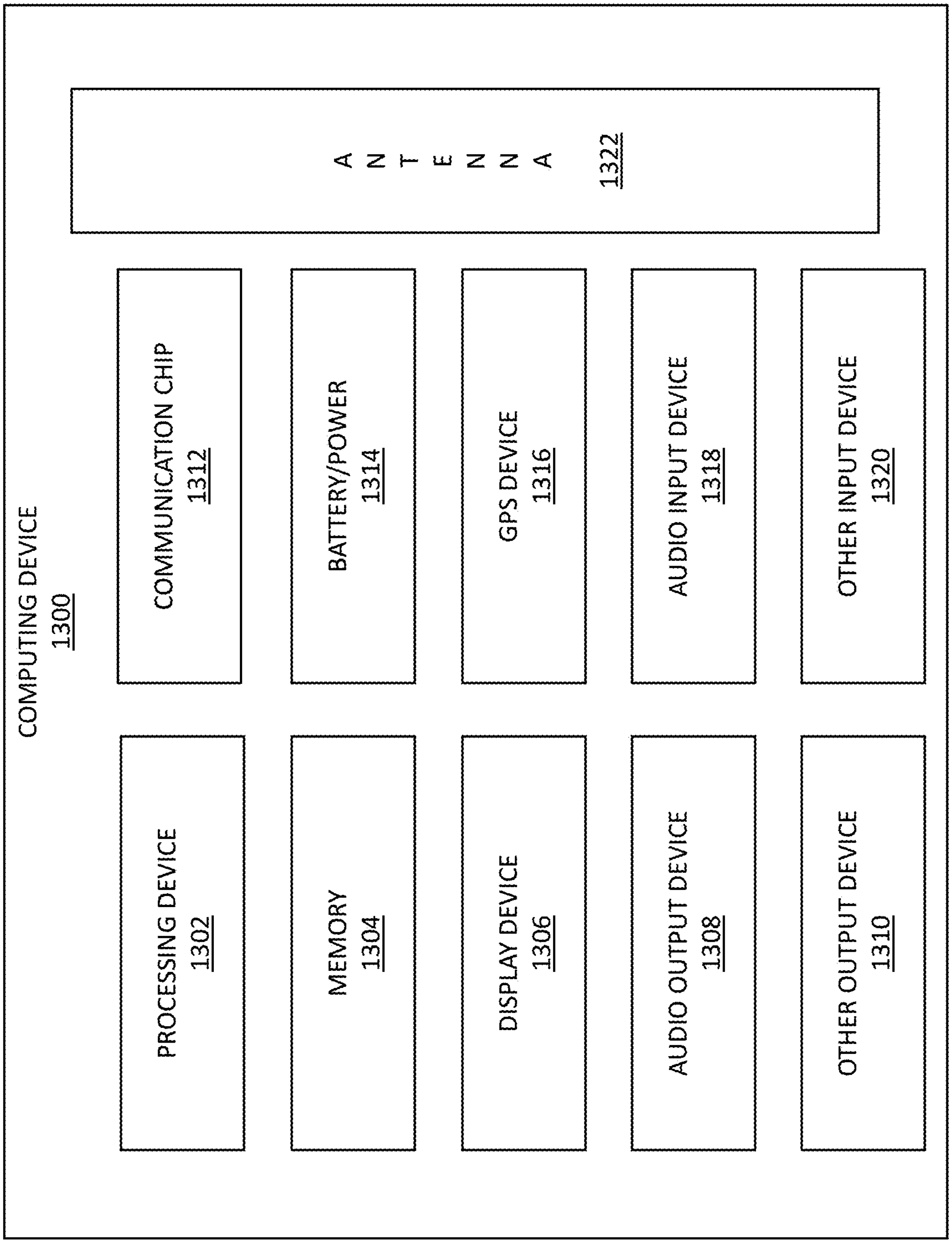
FIG. 13 is a block diagram of an example computing device, in accordance with various embodiments.

FIG. 13 is a block diagram of an example computing device 1300, in accordance with various embodiments. The computing device 1300 may be an embodiment of the DNN system 1100, or of a portion of the DNN system 1100. In some embodiments, the computing device 1300, or some components of the computing device 1300, may be used to perform functions of the controlling module 260.

A number of components are illustrated in FIG. 13 as included in the computing device 1300, but any one or more of these components may be omitted or duplicated, as suitable for the application. In some embodiments, some or all of the components included in the computing device 1300 may be attached to one or more motherboards. In some embodiments, some or all of these components are fabricated onto a single system on a chip (SoC) die. Additionally, in various embodiments, the computing device 1300 may not include one or more of the components illustrated in FIG. 13, but the computing device 1300 may include interface circuitry for coupling to the one or more components. For example, the computing device 1300 may not include a display device 1306, but may include display device interface circuitry (e.g., a connector and driver circuitry) to which a display device 1306 may be coupled. In another set of examples, the computing device 1300 may not include an audio input device 1318 or an audio output device 1308, but may include audio input or output device interface circuitry (e.g., connectors and supporting circuitry) to which an audio input device 1318 or audio output device 1308 may be coupled.

The computing device 1300 may include a processing device 1302 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1302 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1300 may include a memory 1304, which may itself include one or more memory devices such as volatile memory (e.g., DRAM), nonvolatile memory (e.g., read-only memory (ROM)), flash memory, solid state memory, and/or a hard drive. In some embodiments, the memory 1304 may include memory that shares a die with the processing device 1302. In some embodiments, the memory 1304 includes one or more non-transitory computer-readable media storing instructions executable to perform operations for reusing data in convolution operations, e.g., the method 1200 described above in conjunction with FIG. 12A, the method 1250 described above in conjunction with FIG. 12B, or the operations performed by the DNN accelerator 200 described above in conjunction with FIG. 2. The instructions stored in the one or more non-transitory computer-readable media may be executed by the processing device 1302.

In some embodiments, the computing device 1300 may include a communication chip 1312 (e.g., one or more communication chips). For example, the communication chip 1312 may be configured for managing wireless communications for the transfer of data to and from the computing device 1300. The term "wireless" and its derivatives may be used to describe circuits, devices, DNN accelerators, methods, techniques, communications channels, etc., that may communicate data through the use of modulated electromagnetic radiation through a nonsolid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.13 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1312 may operate in accordance with a Global system for Mobile Communication (GSM), General Packet Radio Service (GPRS), Universal Mobile Telecommunications system (UMTS), High Speed Packet Access (HSPA), Evolved HSPA (E-HSPA), or LTE network. The communication chip 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1312 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The computing device 1300 may include an antenna 1322 to facilitate wireless communications and/or to receive other wireless communications (such as AM or FM radio transmissions).

In some embodiments, the communication chip 1312 may manage wired communications, such as electrical, optical, or any other suitable communication protocols (e.g., the Ethernet). As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The computing device 1300 may include battery/power circuitry 1314. The battery/power circuitry 1314 may include one or more energy storage devices (e.g., batteries or capacitors) and/or circuitry for coupling components of the computing device 1300 to an energy source separate from the computing device 1300 (e.g., AC line power).

The computing device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The computing device 1300 may include an audio output device 1308 (or corresponding interface circuitry, as discussed above). The audio output device 1308 may include any device that generates an audible indicator, such as speakers, headsets, or earbuds, for example.

The computing device 1300 may include an audio input device 1318 (or corresponding interface circuitry, as discussed above). The audio input device 1318 may include any device that generates a signal representative of a sound, such as microphones, microphone arrays, or digital instruments (e.g., instruments having a musical instrument digital interface (MIDI) output).

The computing device 1300 may include a GPS device 1316 (or corresponding interface circuitry, as discussed above). The GPS device 1316 may be in communication with a satellite-based system and may receive a location of the computing device 1300, as known in the art.

The computing device 1300 may include an other output device 1313 (or corresponding interface circuitry, as discussed above). Examples of the other output device 1313 may include an audio codec, a video codec, a printer, a wired or wireless transmitter for providing information to other devices, or an additional storage device.

The computing device 1300 may include an other input device 1320 (or corresponding interface circuitry, as discussed above). Examples of the other input device 1320 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1300 may have any desired form factor, such as a handheld or mobile computing system (e.g., a cell phone, a smart phone, a mobile internet device, a music player, a tablet computer, a laptop computer, a netbook computer, an ultrabook computer, a PDA, an ultramobile personal computer, etc.), a desktop computing system, a server or other networked computing component, a printer, a scanner, a monitor, a set-top box, an entertainment control unit, a vehicle control unit, a digital camera, a digital video recorder, or a wearable computing system. In some embodiments, the computing device 1300 may be any other electronic device that processes data.

SELECT EXAMPLES

The following paragraphs provide various examples of the embodiments disclosed herein.

Example 1 provides an apparatus for deep learning includes a PE array, including a plurality of PEs arranged in columns and rows, the PE array configured to perform a convolution operation including a sequence of rounds, where each round includes MAC operations based on a different weight in a weight matrix; a datastore including databanks that are configured to store data to be used by the PE array for the convolution operation; a writing module configured to write data stored in a memory into the datastore; reading modules, a reading module of the reading modules corresponding to a column of the PE array and configured to transfer data from a databank of the datastore to the column of the PE array in a round of the convolution operation; and a controlling module configured to provide the reading module accesses to different databanks of the datastore in different rounds of the convolution operation for transferring data from the different databanks to the column of the PE array in the different rounds.

Example 2 provides the apparatus of example 1, where the controlling module is configured to provide the reading module accesses to the different databanks of the datastore in the different rounds of the convolution operation by for a first round of the convolution operation: providing the reading module an access to a first databank of the datastore for transferring data in the first databank to the column of the PE array; and for a second round that is subsequent to the first round in the sequence of rounds: providing the reading module an access to a second databank of the datastore for transferring data in the second databank to the column, and providing an additional reading module of the reading modules an access to the first databank for transferring the data in the first databank to an additional column of the PE array.

Example 3 provides the apparatus of example 2, where the controlling module is configured to provide the additional reading module an access to a third databank of the datastore for transferring data in the third databank to the additional column for the first round, the second round is adjacently subsequent to the first round, the databanks are arranged in a sequence of databanks, the second databank is adjacently subsequent to the first databank in the sequence of databanks, and the third databank adjacently precedes the first databank in the sequence of databanks.

Example 4 provides the apparatus of example 1, where the controlling module is further configured to instruct the writing module to change data in different databanks of the datastore for different rounds of the convolution operation.

Example 5 provides the apparatus of example 1, where the databank includes a plurality of storage units, and the reading module is configured to access a storage unit of the databank and to transfer data stored in the storage unit to a PE in the column of the PE array.

Example 6 provides the apparatus of example 5, where the storage unit is a circular buffer.

Example 7 provides the apparatus of example 5, where the controlling module is further configured to maintain a reuse index for the storage unit; update the reuse index based on a number of times a set of the reading modules have accessed the storage unit; after updating the reuse index, determine whether the reuse index matches a reuse rate that indicates a maximum number of rounds of the convolution operation in which the data stored in the storage unit can be used; and in response to determining that the reuse index matches the reuse rate, instruct the writing module to transfer new data from the memory into the databank.

Example 8 provides the apparatus of example 7, where the controlling module is configured to instruct the writing module to transfer the new data from the memory into the databank by instructing the writing module to write the new data into the storage unit, where the data stored in the storage unit is removed from the storage unit.

Example 9 provides the apparatus of example 7, where the controlling module is configured to instruct the writing module to transfer the new data from the memory into the databank by instructing the writing module to identify a vacant storage unit in the databank; and instructing the writing module to write the new data into the vacant storage unit.

Example 10 provides the apparatus of example 1, where the databank includes a plurality of contexts, a context includes a portion of an input to a layer of a deep neural network, and the portion of the input is for a MAC operation by a PE in the column of the PE array.

Example 11 provides a method, including determining a sequence of rounds in a convolution operation based on a weight matrix, each round including MAC operations performed by a PE array based on a different weight in the weight matrix, the PE array including columns and rows of PEs; for a first round in the sequence: providing a first reading module an access to a first databank of a datastore, the first reading module configured to transfer data in the first databank to a first column of the PE array, the datastore including databanks that are configured to store data that the PE array uses to perform the convolution operation, and providing a second reading module an access to a second databank of the datastore, the second reading module configured to transfer data in the second databank to a second column of the PE array; and for a second round that is subsequent to the first round in the sequence of rounds, providing the first reading module an access to the second databank, the first reading module configured to transfer the data in the second databank to the first column of the PE array.

Example 12 provides the method of example 11, further including instructing writing modules to transfer input data of a deep neural network (DNN) layer from a memory to the datastore.

Example 13 provides the method of example 11, further including for the second round, instructing a writing module to transfer new data from a memory to the first databank.

Example 14 provides the method of example 13, where instructing the writing module to transfer the new data from the memory to the first databank includes instructing the writing module to write the new data into a storage unit of a plurality of storage units in the first databank, where the storage unit stores data for a MAC operation in the first round, and the data for the MAC operation in the first round is removed in the second round.

Example 15 provides the method of example 13, where instructing the writing module to transfer the new data from the memory to the first databank includes instructing the writing module to identify a vacant storage unit in the first databank; and instructing the writing module to transfer the new data into the vacant storage unit.

Example 16 provides the method of example 13, further including after instructing the writing module to transfer the new data from the memory to the first databank, providing a third reading module an access to the first databank, the third reading module configured to transfer the new data in the first databank to a third column of the PE array, where the third column is subsequent to the first column and the second column in the PE array.

Example 17 provides the method of example 11, where the first databank includes a plurality of storage units, the first reading module is configured to transfer the data in the first databank to the first column by transferring data in a storage unit of the first databank to a PE in the first column, the data in the storage unit include a context, and the context includes input channels for an MAC operation by the PE.

Example 18 provides the method of example 17, where the data in the storage unit further includes a sparsity bitmap for the context, the sparsity bitmap indicates positions of zero values in the context.

Example 19 provides the method of example 11, further including instructing a writing module to change data in different databanks of the datastore for different rounds of the convolution operation.

Example 20 provides the method of example 11, further including maintaining an index for a storage unit of a plurality of storage units in the second databank; instructing a plurality of reading modules to update the index based on a number of times the plurality of reading modules have accessed the storage unit, where the plurality of reading modules includes the first reading module and the second reading module; determining whether the updated index matches a predetermined number; and in response to determining that the updated index matches the predetermined number, instructing a writing module to transfer new data from a memory to the second databank.

Example 21 provides one or more non-transitory computer-readable media storing instructions executable to perform operations, the operations including determining a sequence of rounds in a convolution operation based on a weight matrix, each round including MAC operations by a PE array based on a different weight in the weight matrix, the PE array including columns and rows of PEs; for a first round in the sequence: providing a first reading module an access to a first databank of a datastore, the first reading module configured to transfer data in the first databank to a first column of the PE array, the datastore including databanks that are configured to store data that the PE array uses to perform the convolution operation, and providing a second reading module an access to a second databank of the datastore, the second reading module configured to transfer data in the second databank to a second column of the PE array; and for a second round that is subsequent to the first round in the sequence of rounds, providing the first reading module an access to the second databank, the first reading module configured to transfer the data in the second databank to the first column of the PE array.

Example 22 provides the one or more non-transitory computer-readable media of example 21, where the operations further include for the second round, instructing a writing module to transfer new data from a memory to the first databank.

Example 23 provides the one or more non-transitory computer-readable media of example 22, where instructing the writing module to transfer the new data from the memory to the first databank includes instructing the writing module to identify a vacant storage unit in the first databank; and instructing the writing module to transfer the new data into the vacant storage unit.

Example 24 provides the one or more non-transitory computer-readable media of example 21, where the first databank includes a plurality of storage units, the first reading module is configured to transfer the data in the first databank to the first column by transferring data in a storage unit of the first databank to a PE in the first column, the data in the storage unit include a context, and the context includes input channels for an MAC operation by the PE.

Example 25 provides the one or more non-transitory computer-readable media of example 21, where the operations further include maintaining an index for a storage unit of a plurality of storage units in the second databank; instructing a plurality of reading modules to update the index based on a number of times the plurality of reading modules have accessed the storage unit, where the plurality of reading modules includes the first reading module and the second reading module; determining whether the updated index matches a predetermined number; and in response to determining that the updated index matches the predetermined number, instructing a writing module to transfer new data from a memory to the second databank.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. An apparatus for deep learning includes:

a processing element array, comprising a plurality of processing elements arranged in columns and rows, the processing element array configured to perform a convolution operation including a sequence of rounds, wherein each round includes multiply-accumulate (MAC) operations based on a different weight in a weight matrix;

a datastore comprising databanks that are configured to store data to be used by the processing element array for the convolution operation;

a writing circuit configured to write data stored in a memory into the datastore;

a plurality of reading circuits, a reading circuit of the plurality of reading circuits corresponding to a column of the processing element array and configured to transfer data from a databank of the datastore to the column of the processing element array in a round of the convolution operation; and a controlling circuit configured to:

provide the reading circuit accesses to a first databank of the datastore in a first round of the convolution operation, and provide the reading circuit accesses to a second databank of the datastore in a second round of the convolution operation, wherein the column of the processing element array is to perform MAC operations on data stored in the first databank in the first round and to perform MAC operations on data stored in the second databank in the second round, wherein another column of the processing element array is to perform MAC operations on the data stored in the second databank in the first round.

2. The apparatus of claim 1, wherein the controlling circuit is further configured to:

for the second round, providing an additional reading circuit of the reading circuits an access to the first databank for transferring the data in the first databank to an additional column of the processing element array.

3. The apparatus of claim 2, wherein:

the controlling circuit is configured to provide the additional reading circuit an access to a third databank of the datastore for transferring data in the third databank to the additional column for the first round, the second round is adjacently subsequent to the first round, the databanks are arranged in a sequence of databanks, the second databank is adjacently subsequent to the first databank in the sequence of databanks, and the third databank adjacently precedes the first databank in the sequence of databanks.

4. The apparatus of claim 1, wherein the controlling circuit is further configured to instruct the writing circuit to change data in different databanks of the datastore for different rounds of the convolution operation.

5. The apparatus of claim 1, wherein the databank comprises a plurality of storage units, and the reading circuit is configured to access a storage unit of the databank and to transfer data stored in the storage unit to a processing element in the column of the processing element array.

6. The apparatus of claim 5, wherein the storage unit is a circular buffer.

7. The apparatus of claim 5, wherein the controlling circuit is further configured to:

maintain a reuse index for the storage unit;

update the reuse index based on a number of times a set of the reading circuits have accessed the storage unit;

after updating the reuse index, determine whether the reuse index matches a reuse rate that indicates a maximum number of rounds of the convolution operation in which the data stored in the storage unit can be used; and in response to determining that the reuse index matches the reuse rate, instruct the writing circuit to transfer new data from the memory into the databank.

8. The apparatus of claim 7, wherein the controlling circuit is configured to instruct the writing circuit to transfer the new data from the memory into the databank by:

instructing the writing circuit to write the new data into the storage unit, wherein the data stored in the storage unit is removed from the storage unit.

9. The apparatus of claim 7, wherein the controlling circuit is configured to instruct the writing circuit to transfer the new data from the memory into the databank by:

instructing the writing circuit to identify a vacant storage unit in the databank; and instructing the writing circuit to write the new data into the vacant storage unit.

10. The apparatus of claim 1, wherein the databank comprises a plurality of contexts, a context includes a portion of an input to a layer of a deep neural network, and the portion of the input is for a MAC operation, the MAC operation performed by a processing element in the column of the processing element array.

11. A method, comprising:

determining a sequence of rounds in a convolution operation based on a weight matrix, each round including multiply-accumulate (MAC) operations performed by a processing element array based on a different weight in the weight matrix, the processing element array comprising columns and rows of processing elements;

for a first round in the sequence:

providing a first reading circuit an access to a first databank of a datastore, the first reading circuit configured to transfer data in the first databank to a first column of the processing element array, the datastore comprising databanks that are configured to store data that the processing element array uses to perform the convolution operation, and providing a second reading circuit an access to a second databank of the datastore, the second reading circuit configured to transfer data in the second databank to a second column of the processing element array; and for a second round that is subsequent to the first round in the sequence of rounds, providing the first reading circuit an access to the second databank, the first reading circuit configured to transfer the data in the second databank to the first column of the processing element array, wherein the first column of the processing element array is to perform MAC operations on data stored in the first databank in the first round and to perform MAC operations on data stored in the second databank in the second round, wherein another column of the processing element array is to perform MAC operations on the data stored in the second databank in the first round.

12. The method of claim 11, further comprising:

instructing writing circuits to transfer input data of a deep neural network (DNN) layer from a memory to the datastore.

13. The method of claim 11, further comprising:

for the second round, instructing a writing circuit to transfer new data from a memory to the first databank.

14. The method of claim 13, wherein instructing the writing circuit to transfer the new data from the memory to the first databank comprises:

instructing the writing circuit to write the new data into a storage unit of a plurality of storage units in the first databank, wherein the storage unit stores data for a MAC operation in the first round, and the data for the MAC operation in the first round is removed in the second round.

15. The method of claim 13, wherein instructing the writing circuit to transfer the new data from the memory to the first databank comprises:

instructing the writing circuit to identify a vacant storage unit in the first databank; and instructing the writing circuit to transfer the new data into the vacant storage unit.

16. The method of claim 13, further comprising:

after instructing the writing circuit to transfer the new data from the memory to the first databank, providing a third reading circuit an access to the first databank, the third reading circuit configured to transfer the new data in the first databank to a third column of the processing element array, wherein the third column is subsequent to the first column and the second column in the processing element array.

17. The method of claim 11, wherein:

the first databank includes a plurality of storage units, the first reading circuit is configured to transfer the data in the first databank to the first column by transferring data in a storage unit of the first databank to a processing element in the first column, the data in the storage unit comprise a context, and the context includes input channels for an MAC operation, the MAC operation performed by the processing element.

18. The method of claim 17, wherein the data in the storage unit further comprises a sparsity bitmap for the context, the sparsity bitmap indicates positions of zero values in the context.

19. The method of claim 11, further comprising:

instructing a writing circuit to change data in different databanks of the datastore for different rounds of the convolution operation.

20. The method of claim 11, further comprising:

maintaining an index for a storage unit of a plurality of storage units in the second databank;

instructing a plurality of reading circuits to update the index based on a number of times the plurality of reading circuits have accessed the storage unit, wherein the plurality of reading circuits includes the first reading circuit and the second reading circuit;

determining whether the updated index matches a predetermined number; and in response to determining that the updated index matches the predetermined number, instructing a writing circuit to transfer new data from a memory to the second databank.

21. One or more non-transitory computer-readable media storing instructions executable to perform operations, the operations comprising:

determining a sequence of rounds in a convolution operation based on a weight matrix, each round including multiply-accumulate (MAC) operations performed by a processing element array based on a different weight in the weight matrix, the processing element array comprising columns and rows of processing elements;

for a first round in the sequence:

providing a first reading circuit an access to a first databank of a datastore, the first reading circuit configured to transfer data in the first databank to a first column of the processing element array, the datastore comprising databanks that are configured to store data that the processing element array uses to perform the convolution operation, and providing a second reading circuit an access to a second databank of the datastore, the second reading circuit configured to transfer data in the second databank to a second column of the processing element array; and for a second round that is subsequent to the first round in the sequence of rounds, providing the first reading circuit an access to the second databank, the first reading circuit configured to transfer the data in the second databank to the first column of the processing element array, wherein the first column of the processing element array is to perform MAC operations on data stored in the first databank in the first round and to perform MAC operations on data stored in the second databank in the second round, wherein another column of the processing element array is to perform MAC operations on the data stored in the second databank in the first round.

22. The one or more non-transitory computer-readable media of claim 21, wherein the operations further comprise:

for the second round, instructing a writing circuit to transfer new data from a memory to the first databank.

23. The one or more non-transitory computer-readable media of claim 22, wherein instructing the writing circuit to transfer the new data from the memory to the first databank comprises:

instructing the writing circuit to identify a vacant storage unit in the first databank; and instructing the writing circuit to transfer the new data into the vacant storage unit.

24. The one or more non-transitory computer-readable media of claim 21, wherein:

the first databank includes a plurality of storage units, the first reading circuit is configured to transfer the data in the first databank to the first column by transferring data in a storage unit of the first databank to a processing element in the first column, the data in the storage unit comprise a context, and the context includes input channels for an MAC operation, the MAC operation performed by the processing element.

25. The one or more non-transitory computer-readable media of claim 21, wherein the operations further comprise:

maintaining an index for a storage unit of a plurality of storage units in the second databank;

instructing a plurality of reading circuits to update the index based on a number of times the plurality of reading circuits have accessed the storage unit, wherein the plurality of reading circuits includes the first reading circuit and the second reading circuit;

determining whether the updated index matches a predetermined number; and in response to determining that the updated index matches the predetermined number, instructing a writing circuit to transfer new data from a memory to the second databank.

* * * * *